Aug. 25, 1936.   C. A. BICKEL   2,052,441
APPARATUS FOR CONTROLLING OPERATION OF TOOLS
Filed Oct. 20, 1933   25 Sheets-Sheet 4
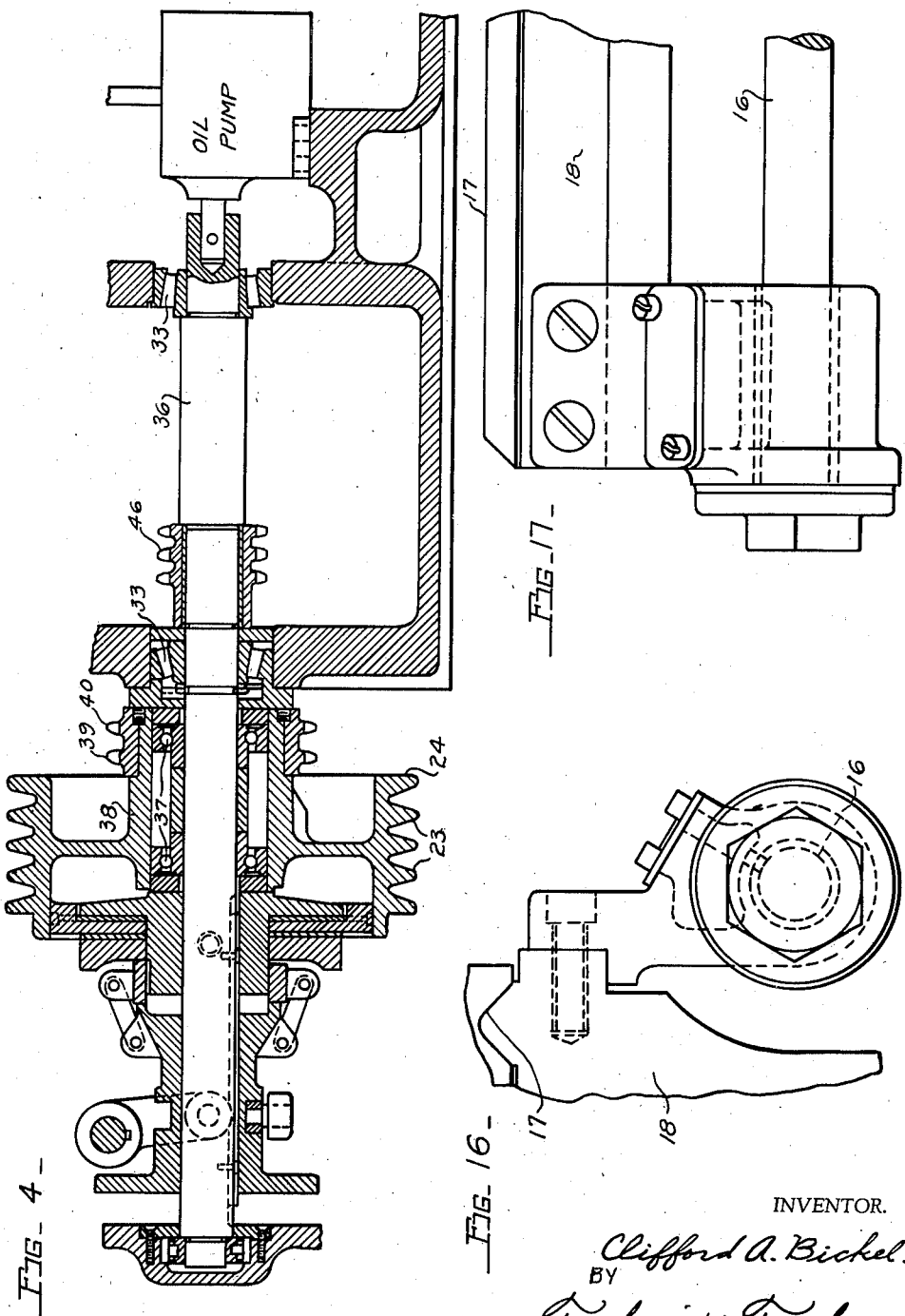
INVENTOR.
Clifford A. Bickel.
BY
ATTORNEYS

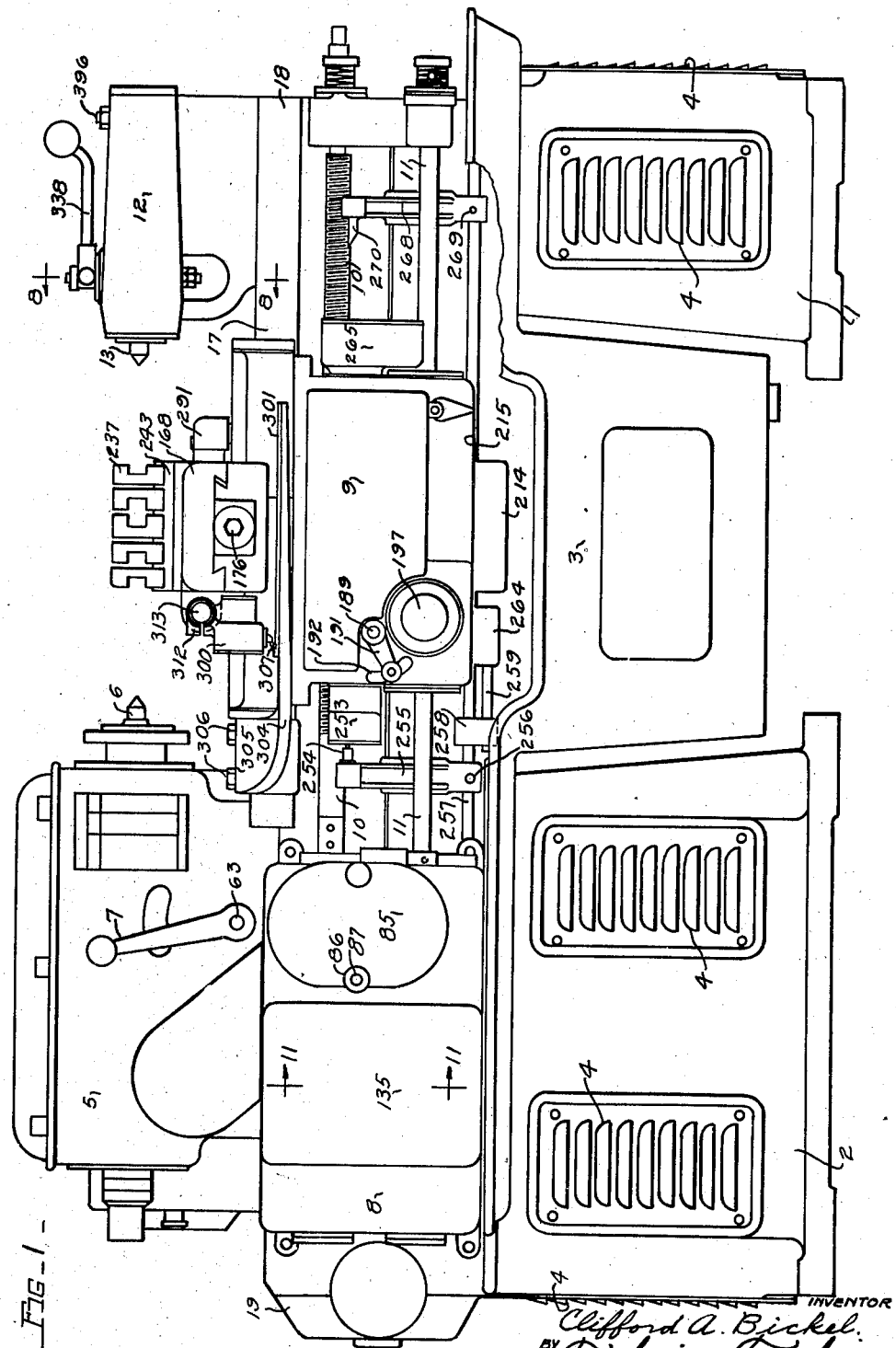

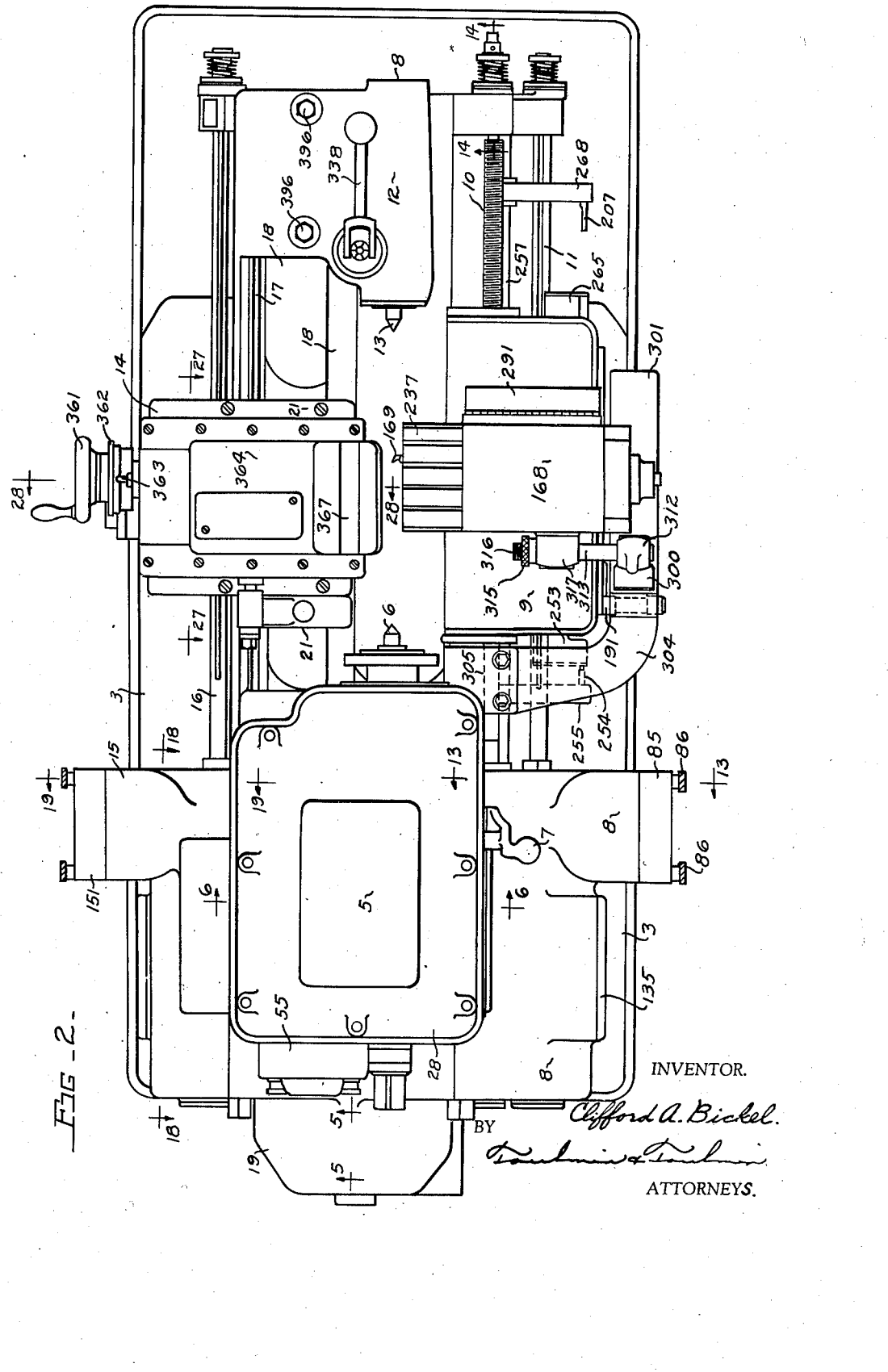

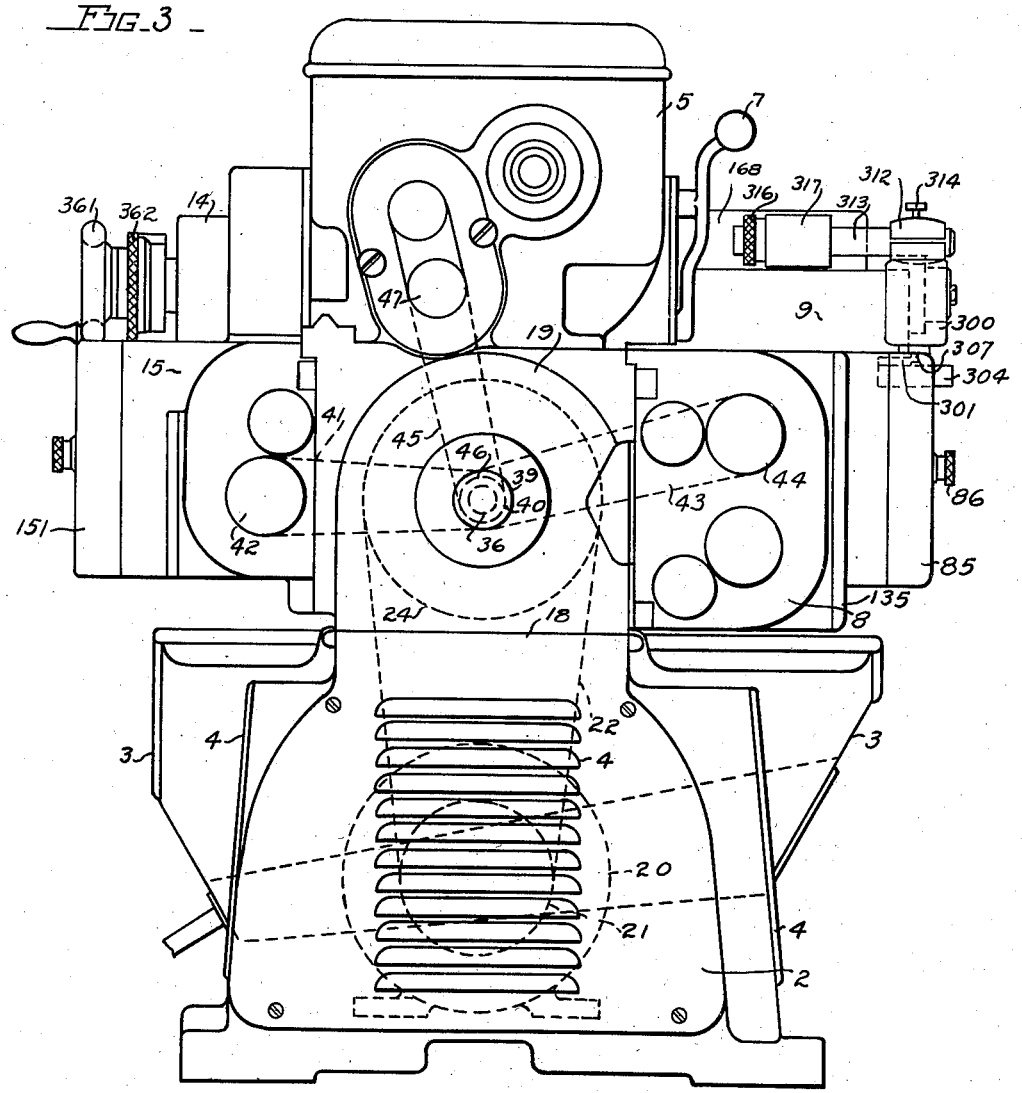

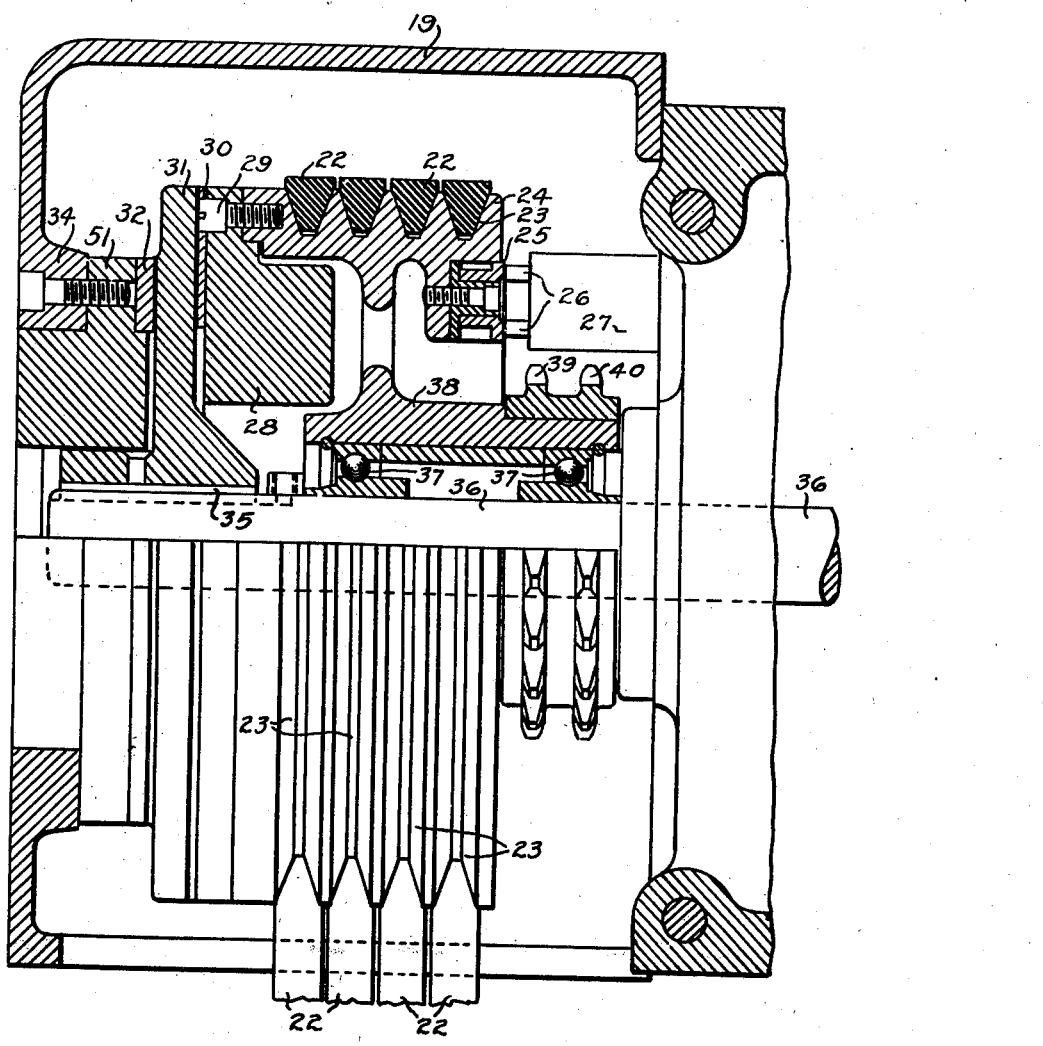

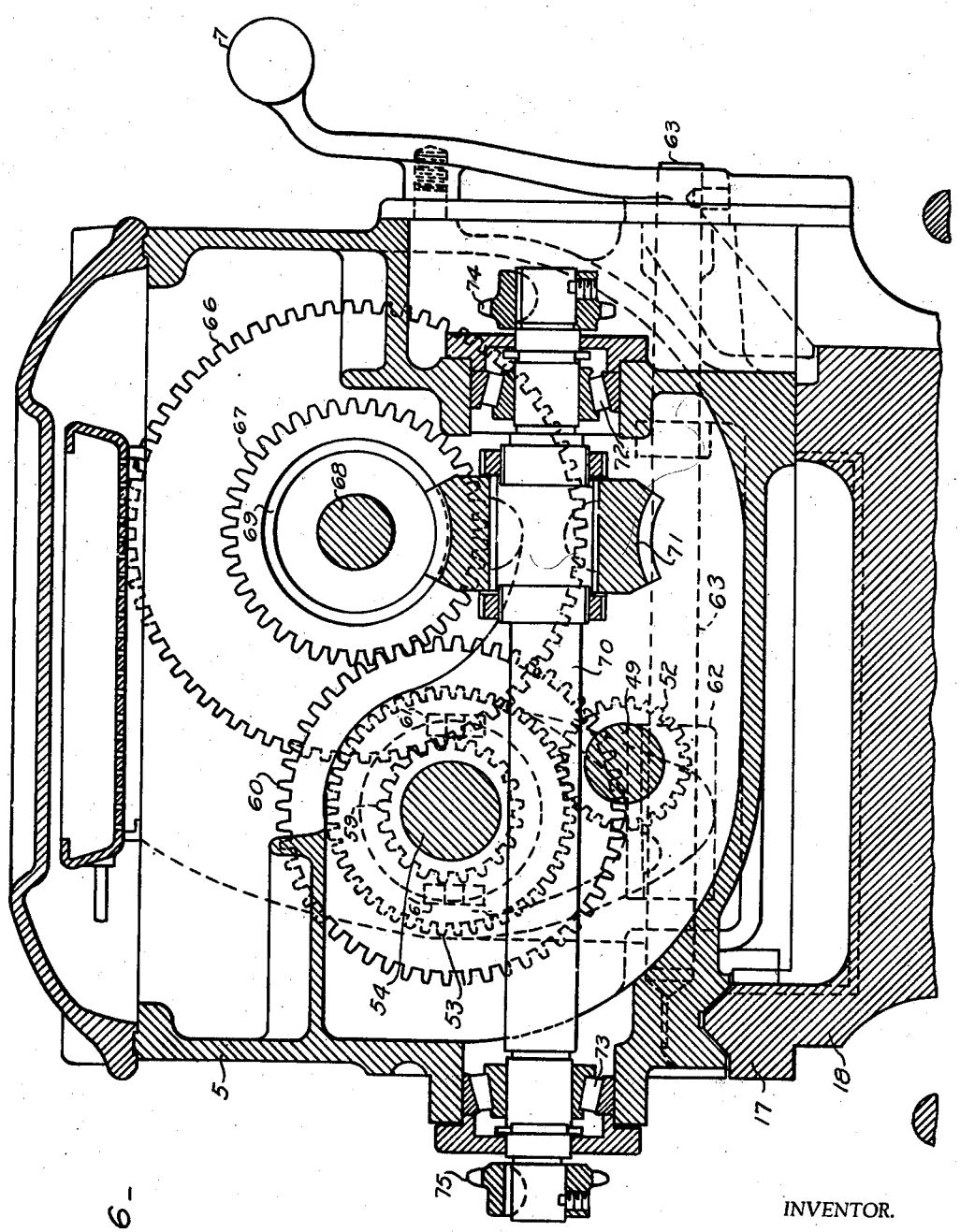

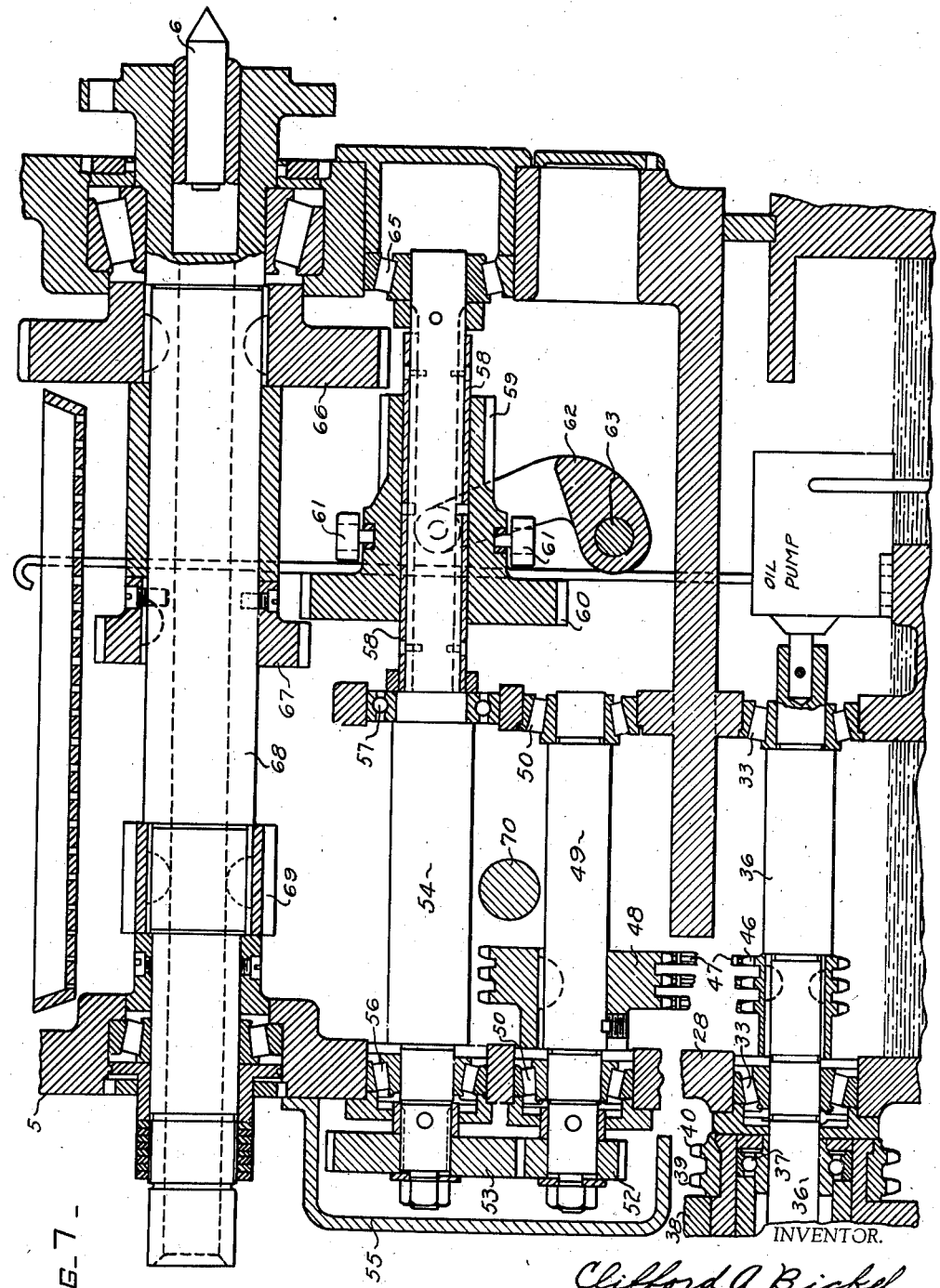

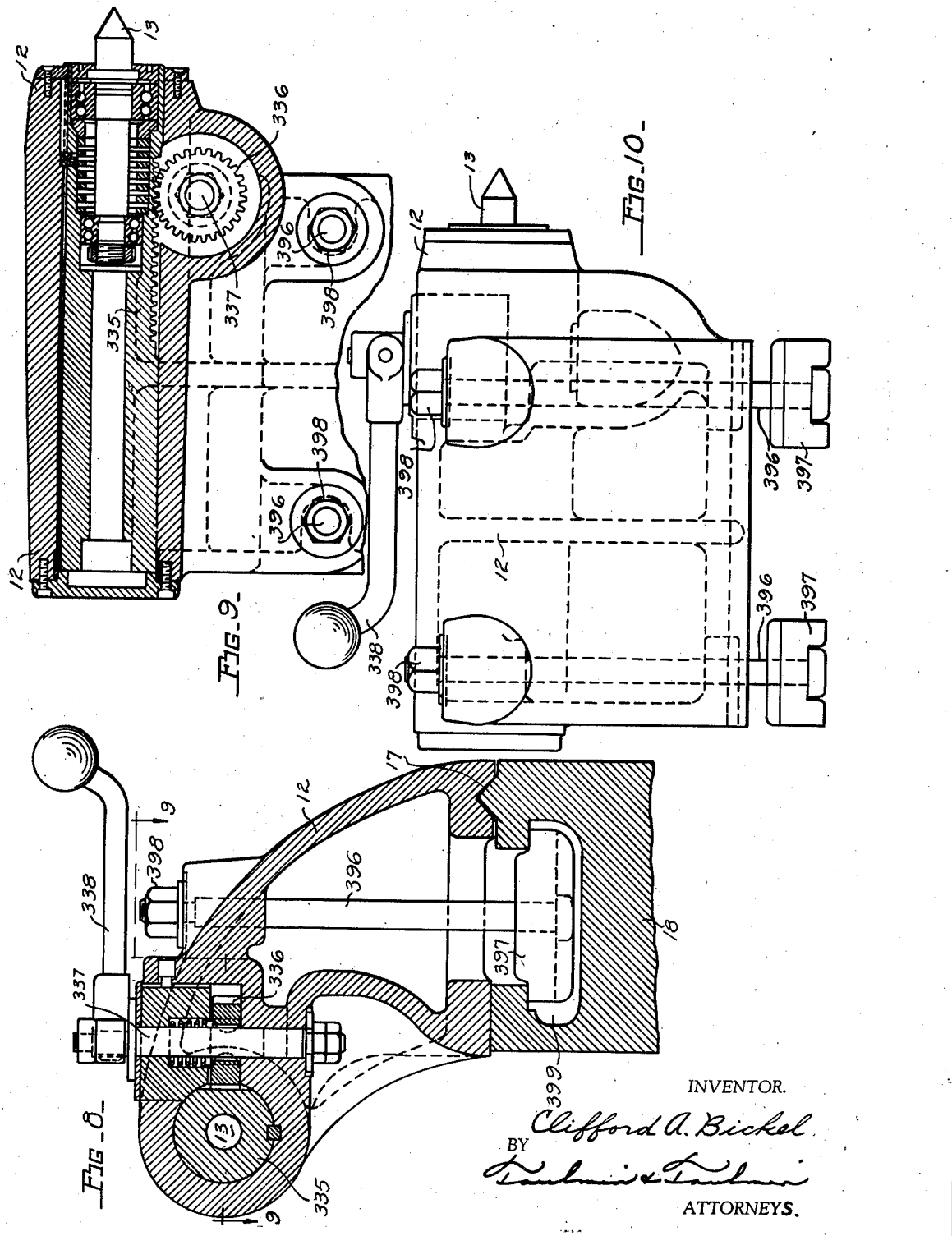

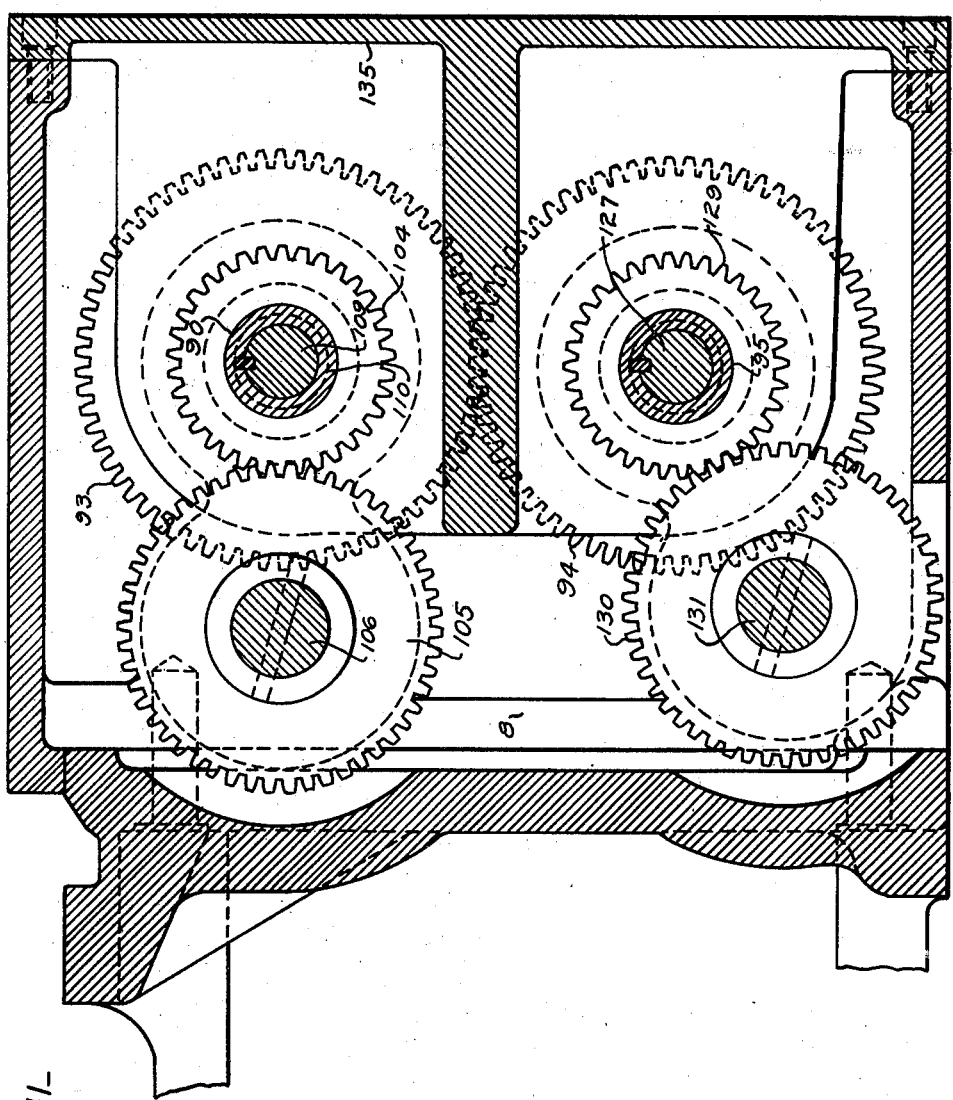

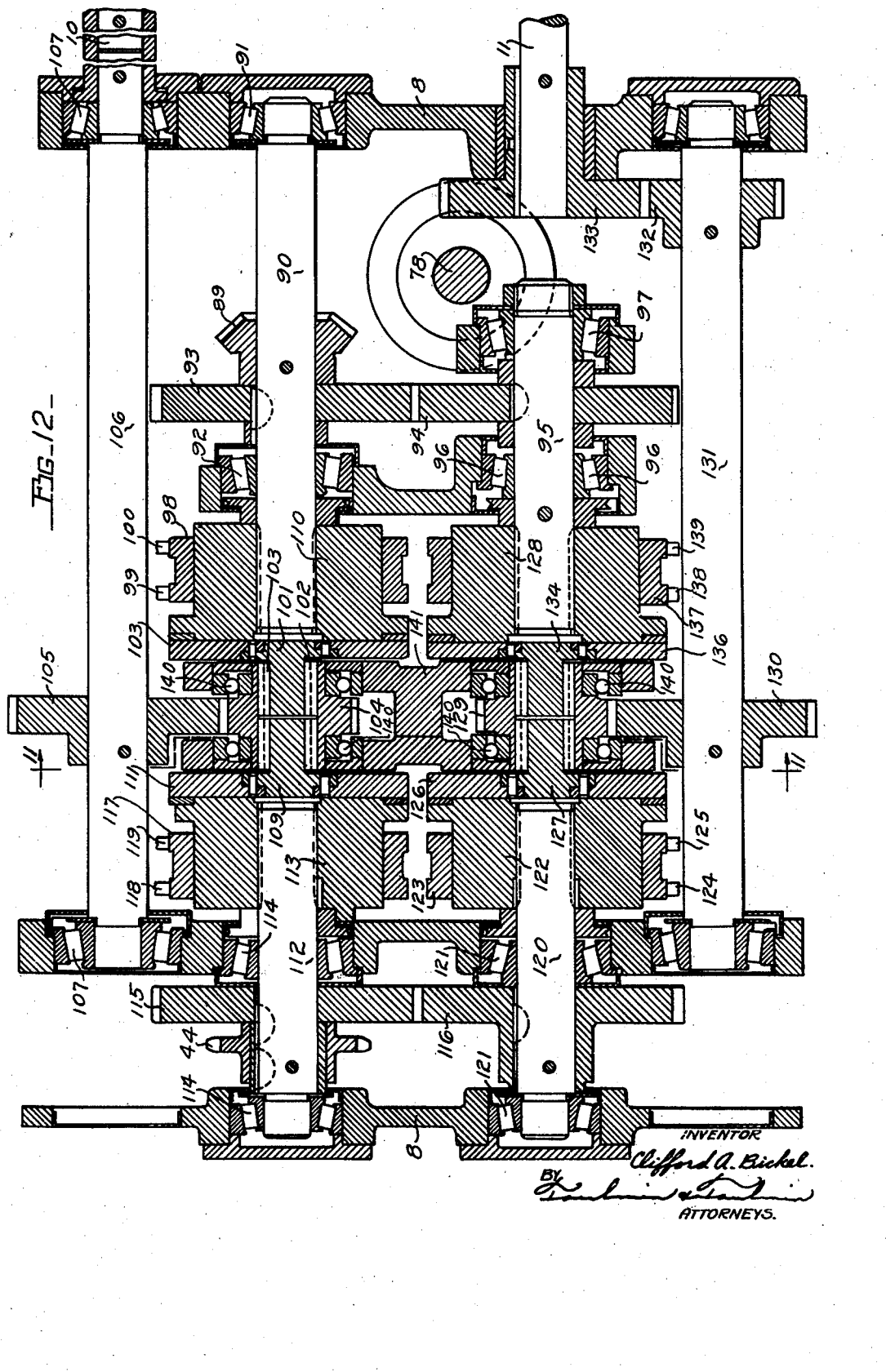

Aug. 25, 1936.  C. A. BICKEL  2,052,441
APPARATUS FOR CONTROLLING OPERATION OF TOOLS
Filed Oct. 20, 1933   25 Sheets-Sheet 11

Inventor
CLIFFORD A. BICKEL,

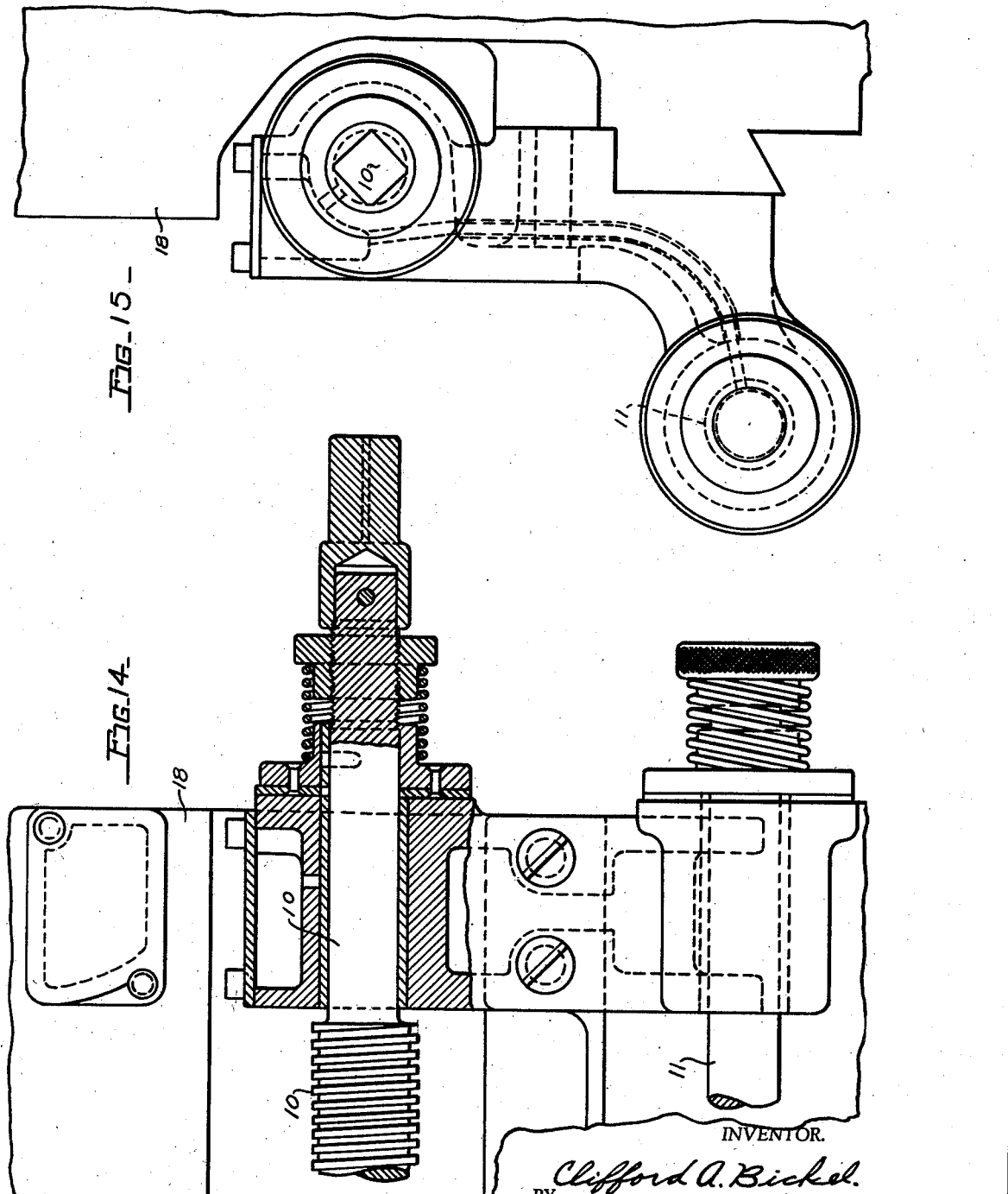

Aug. 25, 1936.   C. A. BICKEL   2,052,441
APPARATUS FOR CONTROLLING OPERATION OF TOOLS
Filed Oct. 20, 1933   25 Sheets-Sheet 13
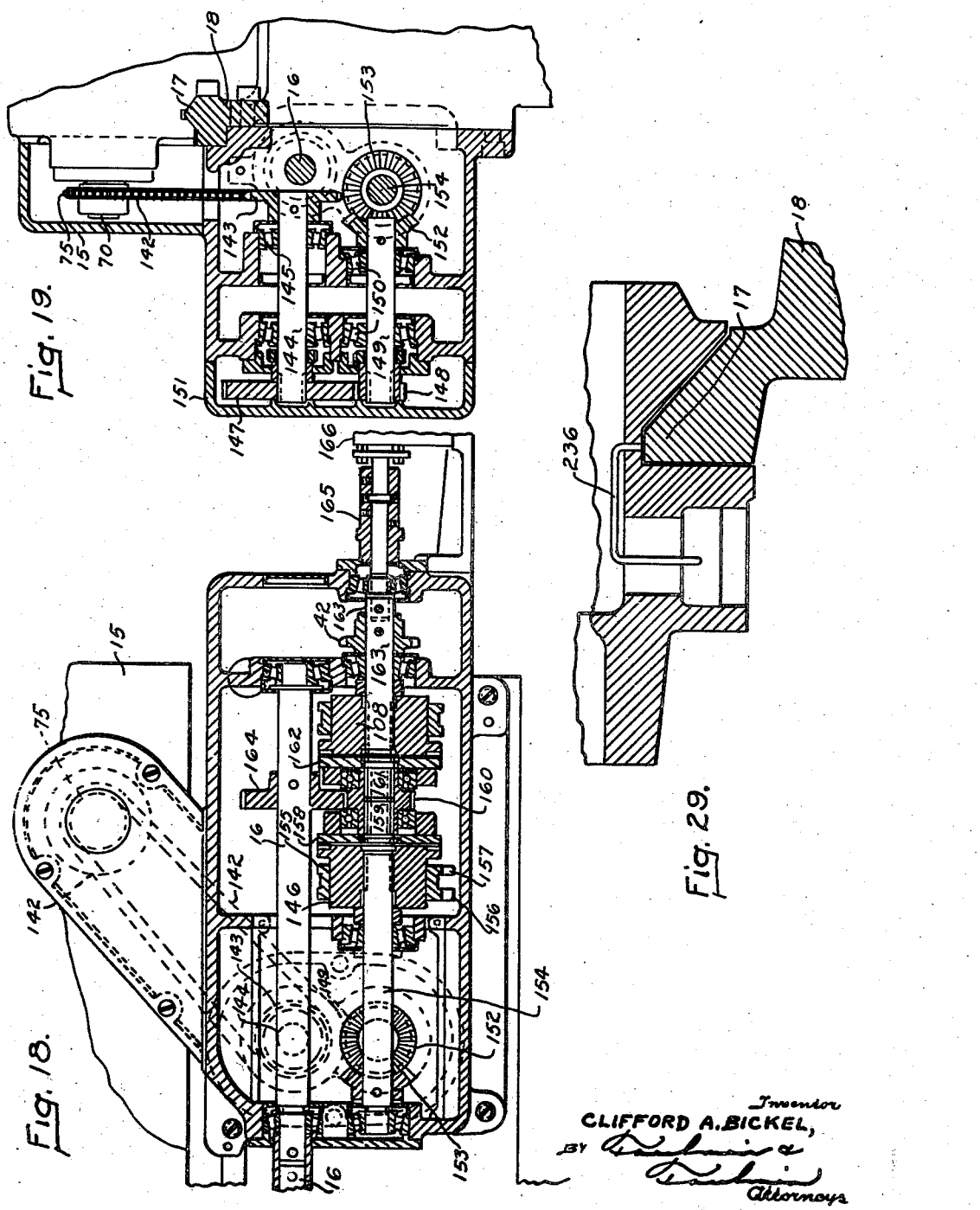

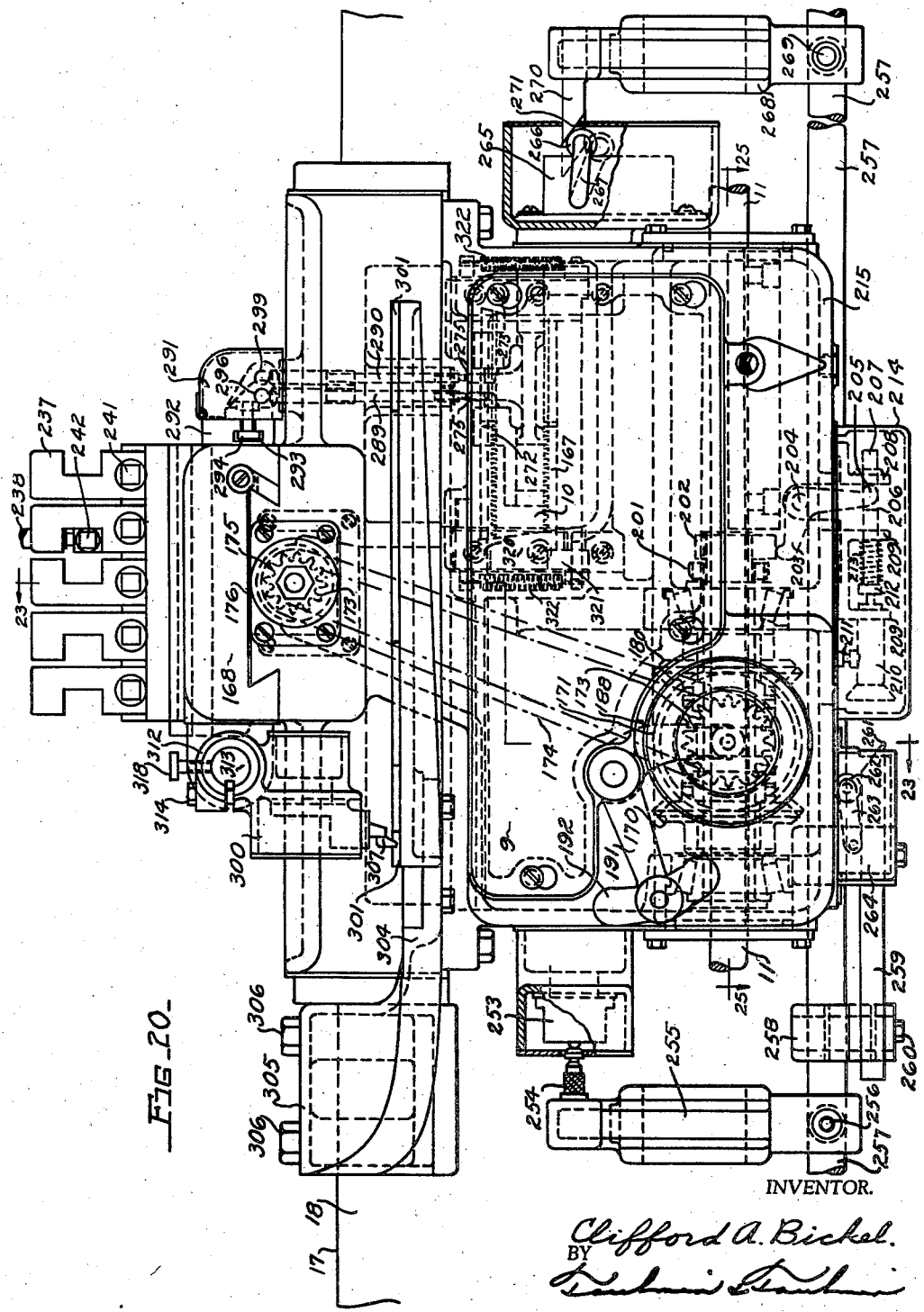

Aug. 25, 1936.　　　　C. A. BICKEL　　　　2,052,441
APPARATUS FOR CONTROLLING OPERATION OF TOOLS
Filed Oct. 20, 1933　　25 Sheets-Sheet 15
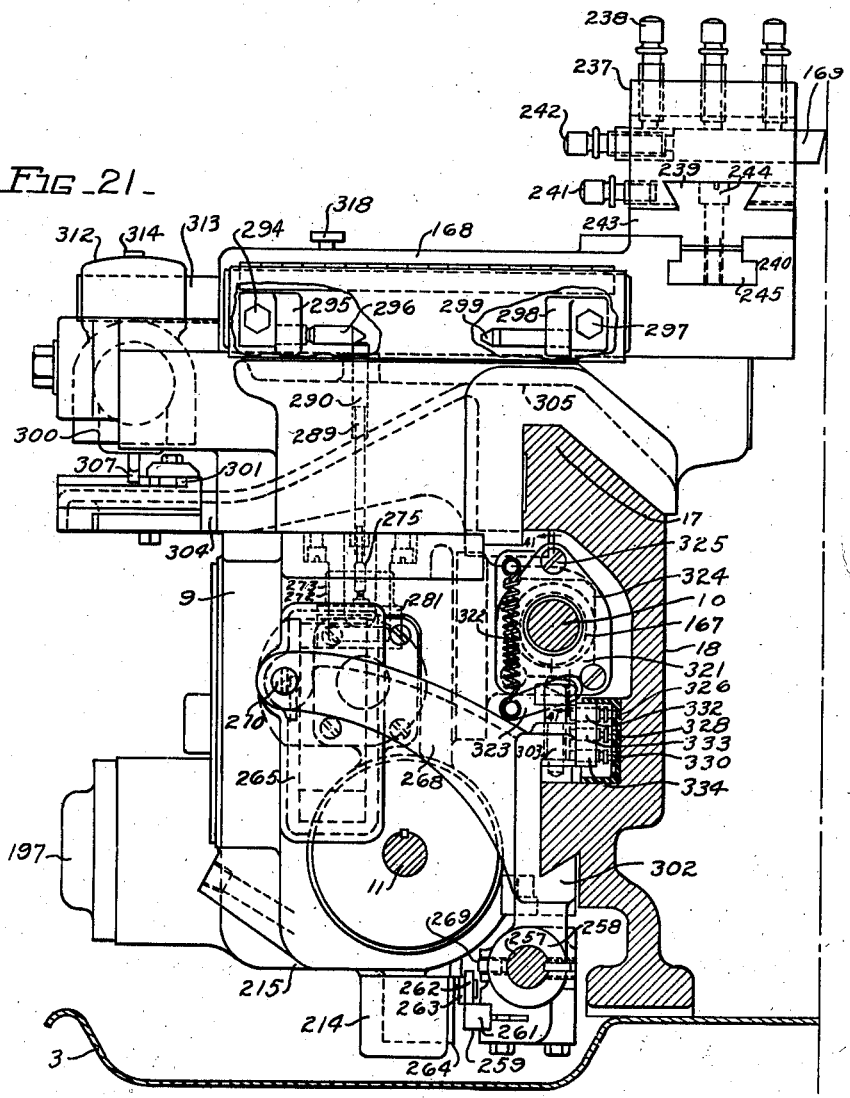
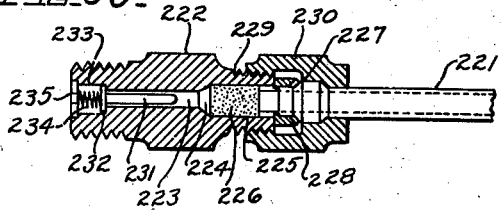
INVENTOR.
Clifford A. Bickel.
BY
ATTORNEYS

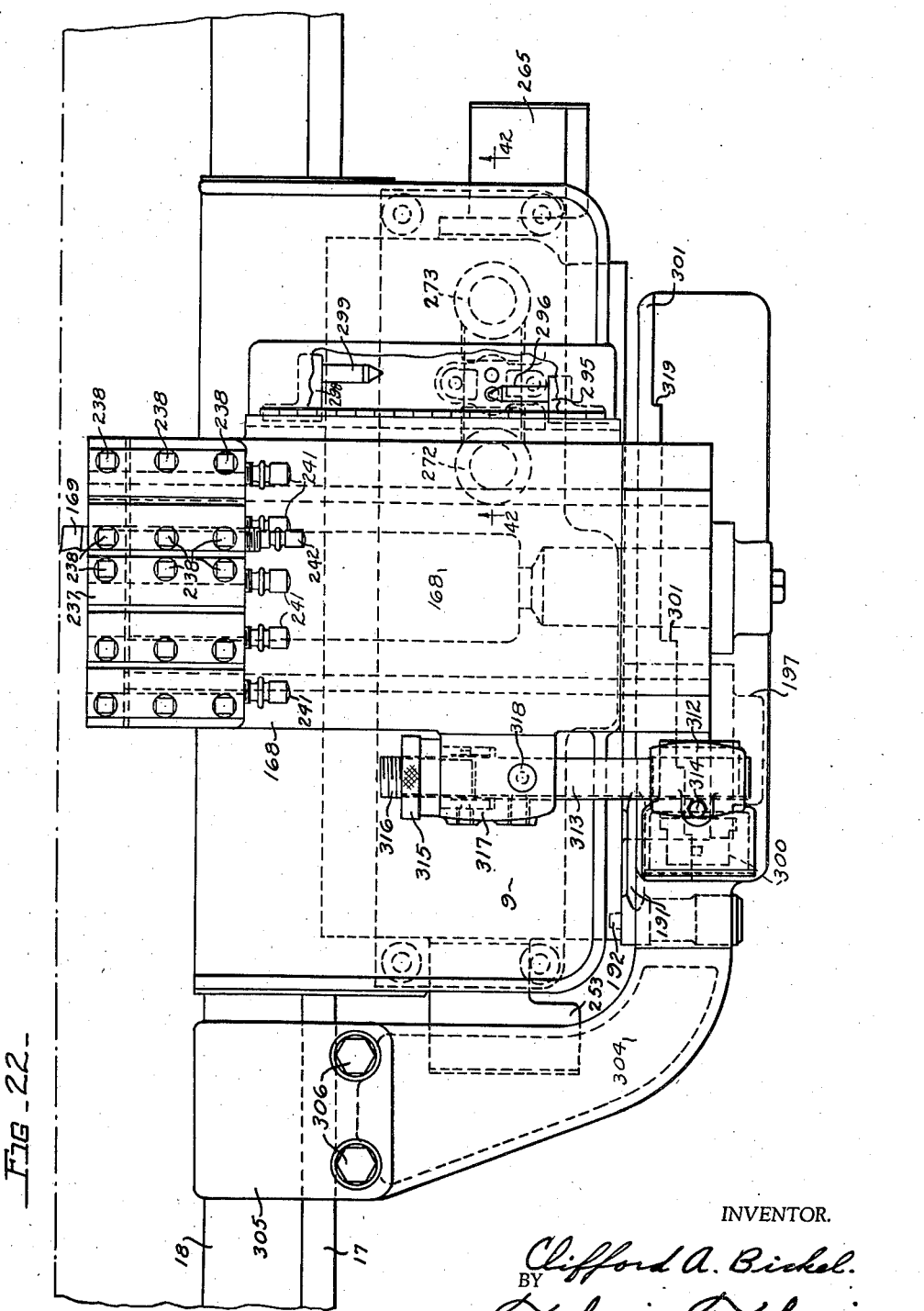

Aug. 25, 1936.  C. A. BICKEL  2,052,441
APPARATUS FOR CONTROLLING OPERATION OF TOOLS
Filed Oct. 20, 1933   25 Sheets-Sheet 17
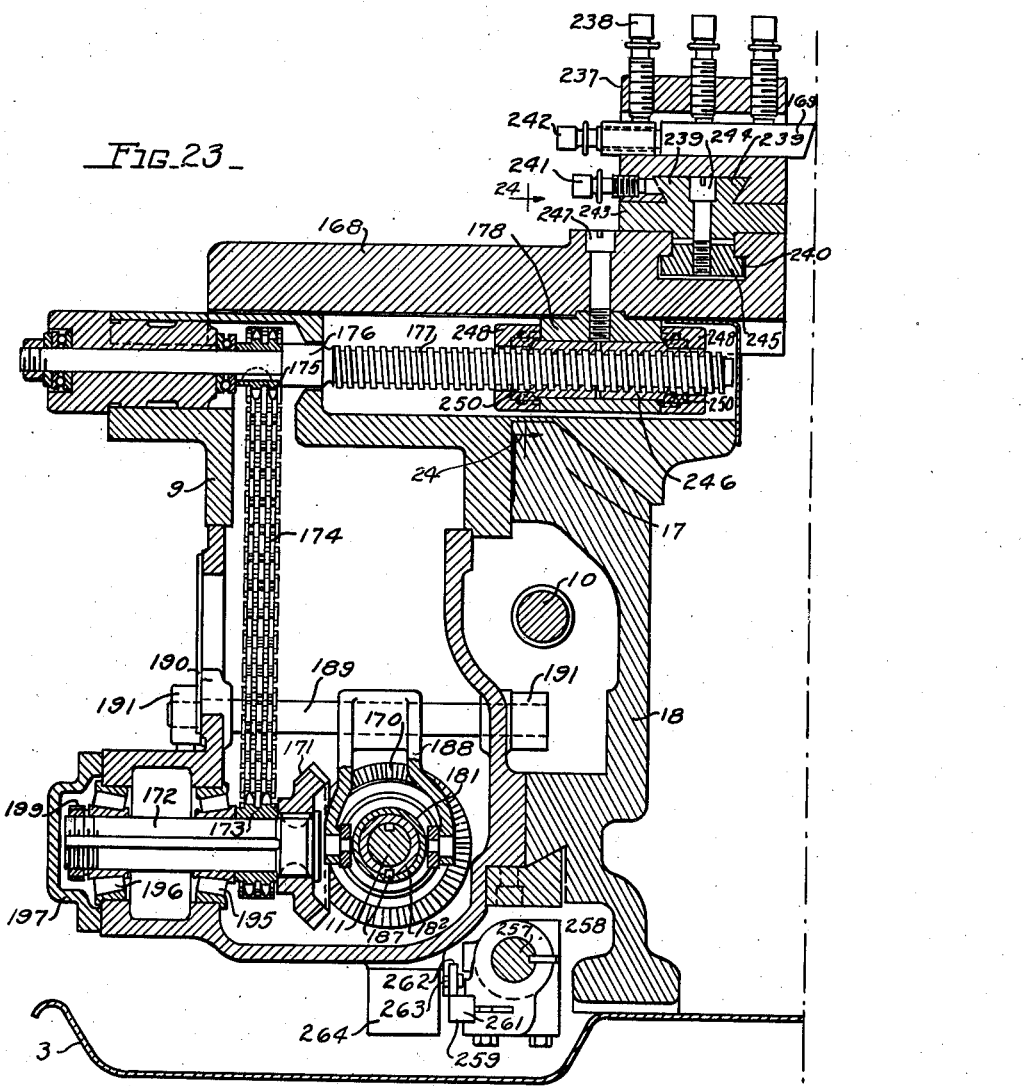
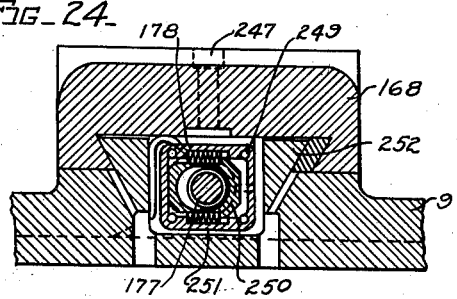
INVENTOR.
Clifford A. Bickel.
BY
ATTORNEYS

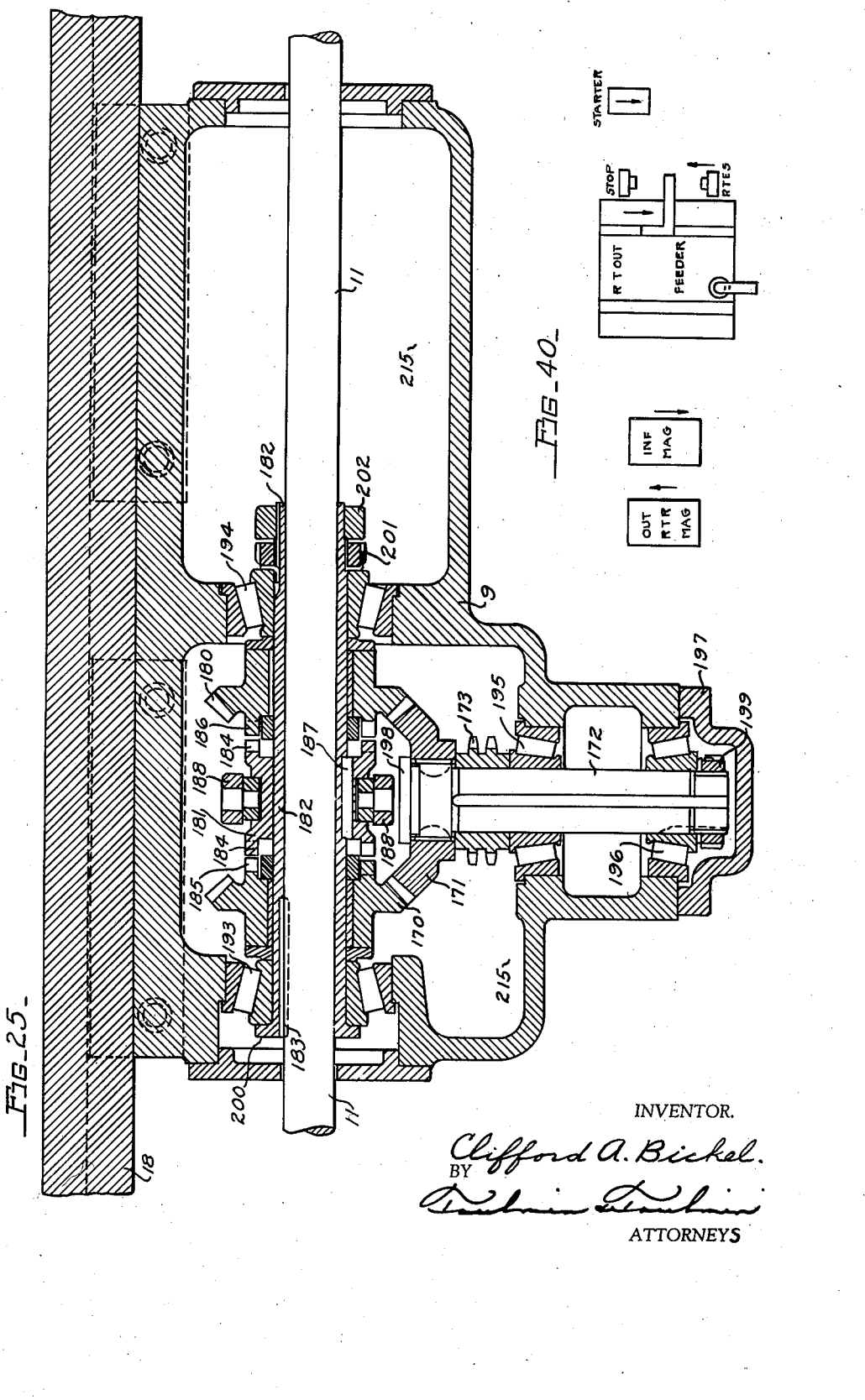

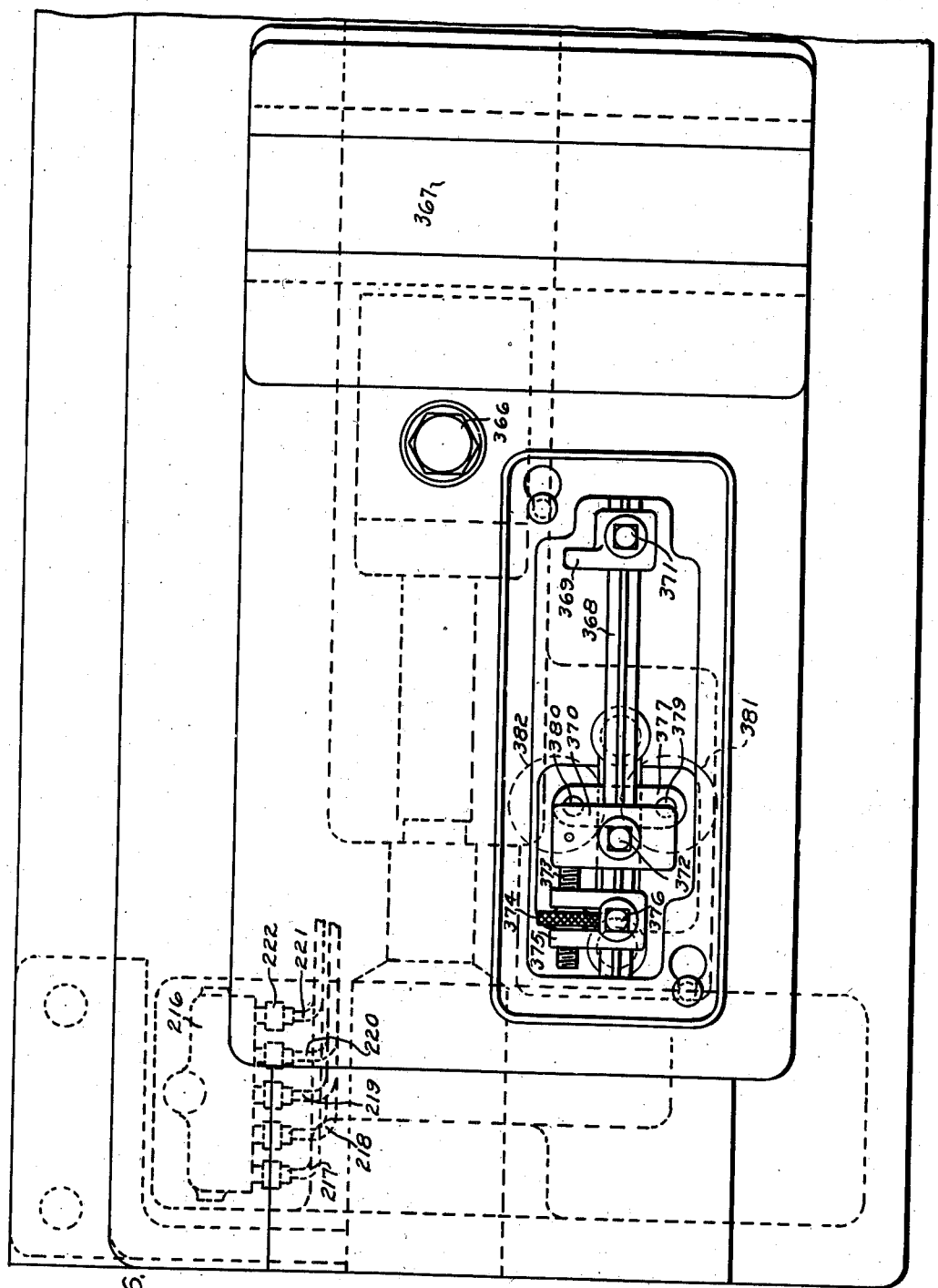

Aug. 25, 1936.　　　　C. A. BICKEL　　　　2,052,441
APPARATUS FOR CONTROLLING OPERATION OF TOOLS
Filed Oct. 20, 1933　　25 Sheets-Sheet 20
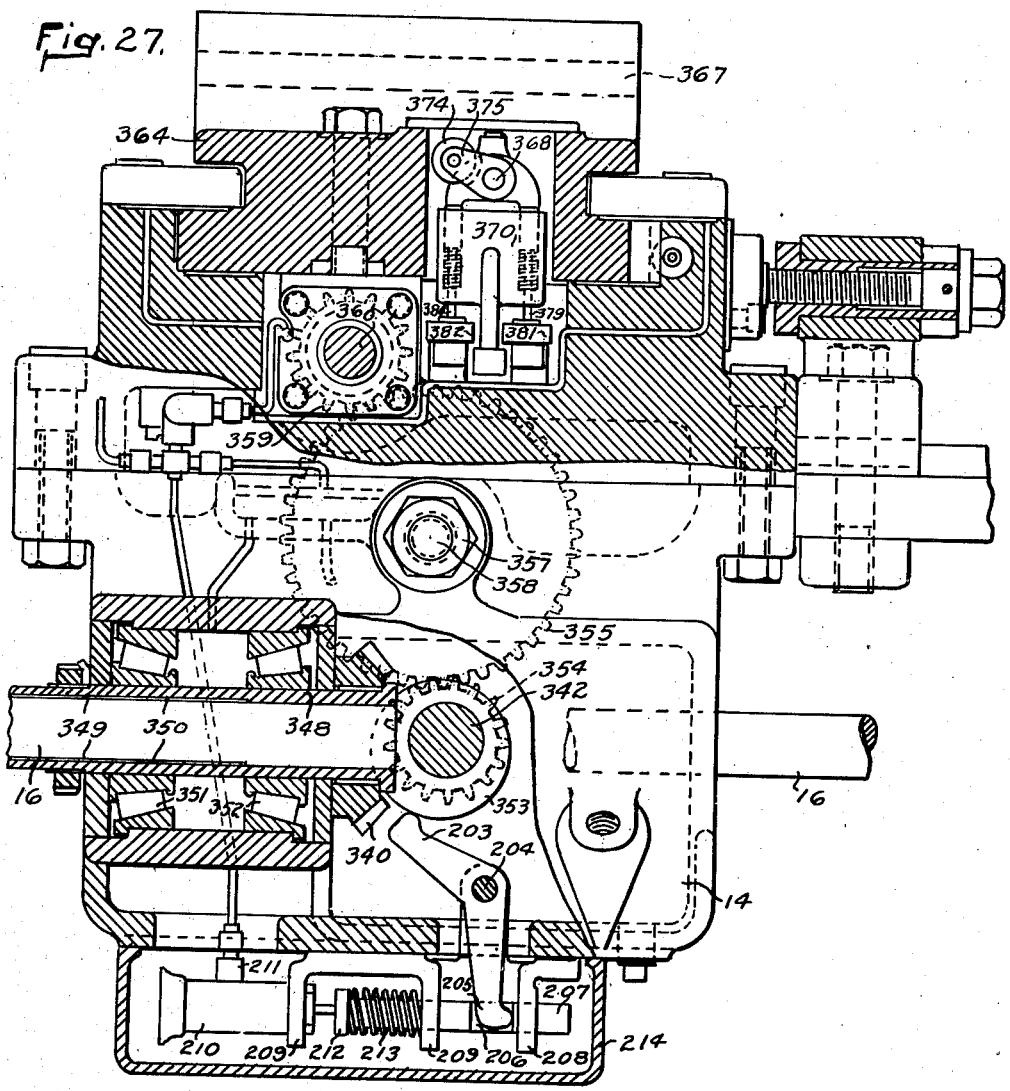
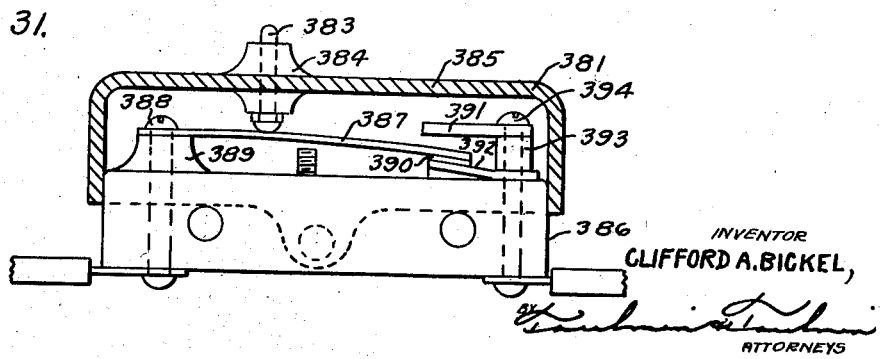
INVENTOR
CLIFFORD A. BICKEL,
ATTORNEYS

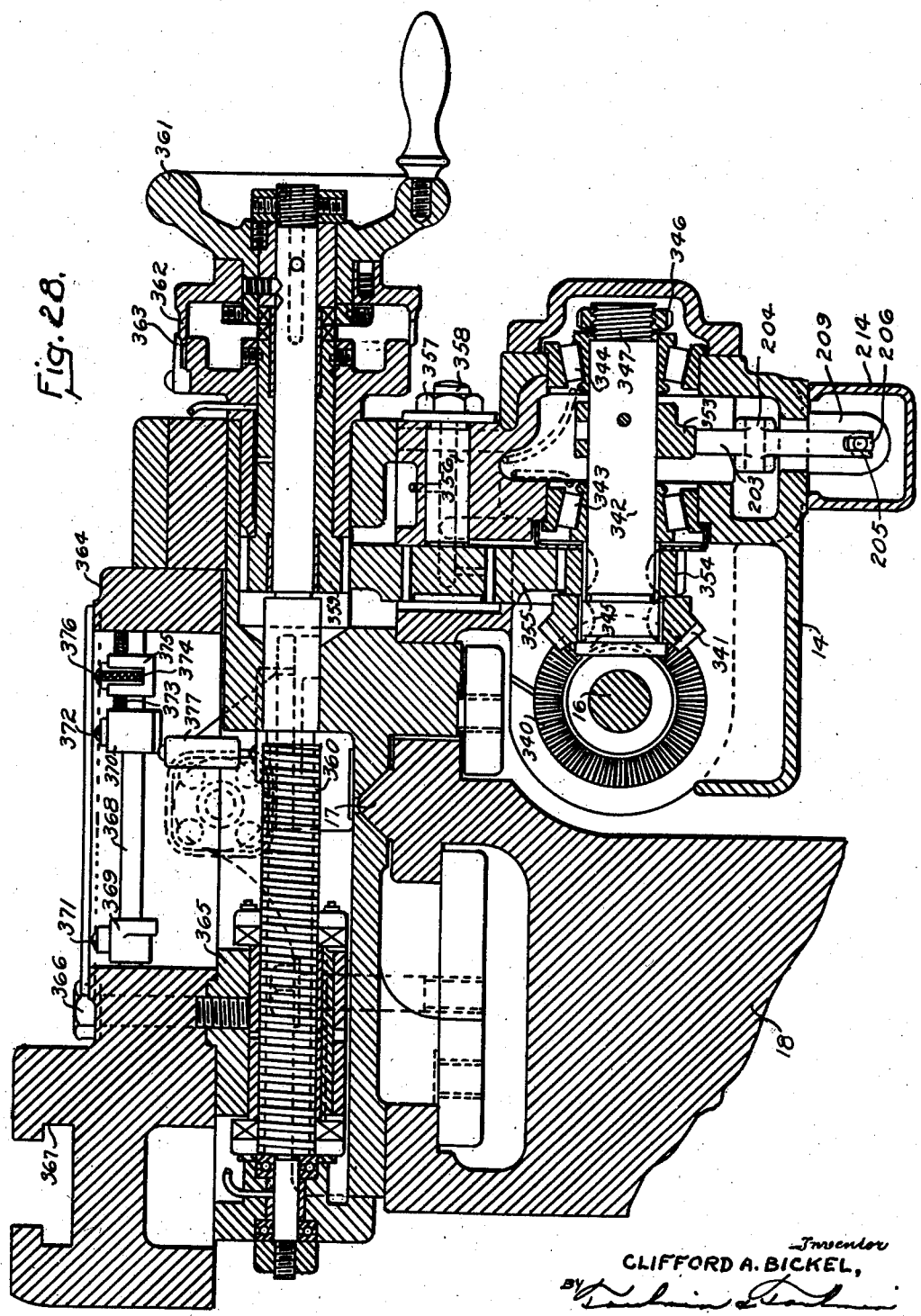

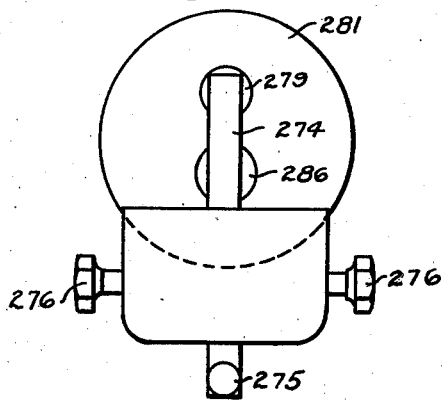
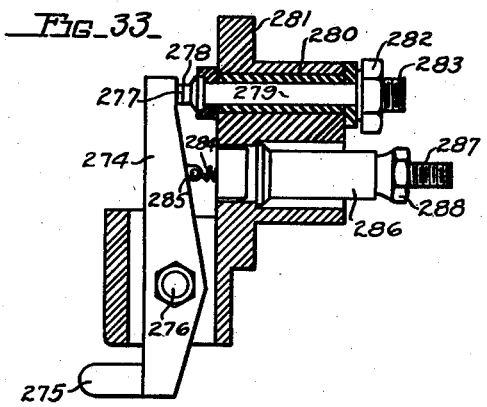
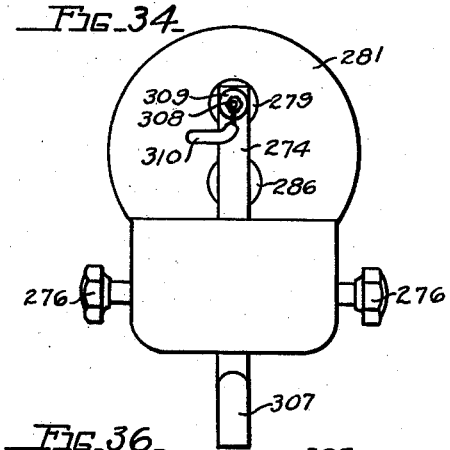
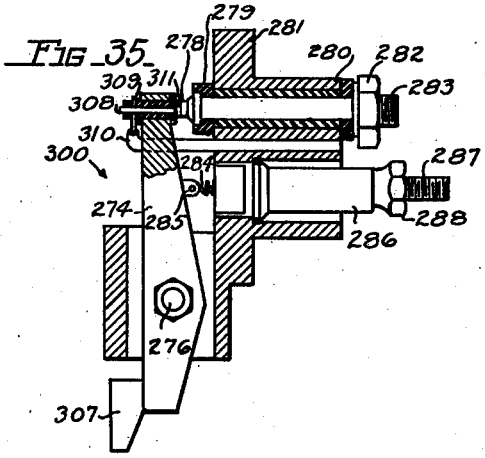
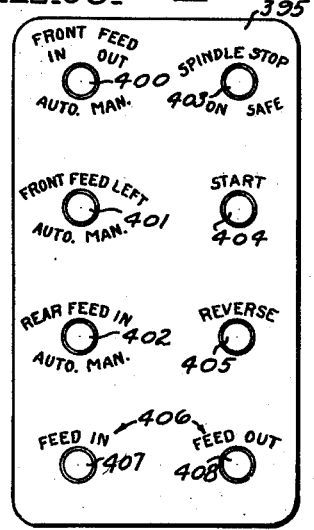
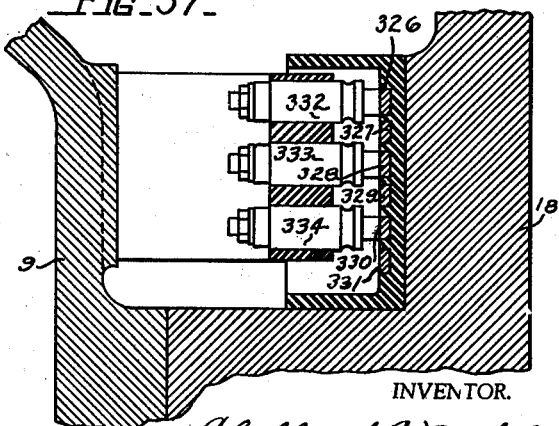

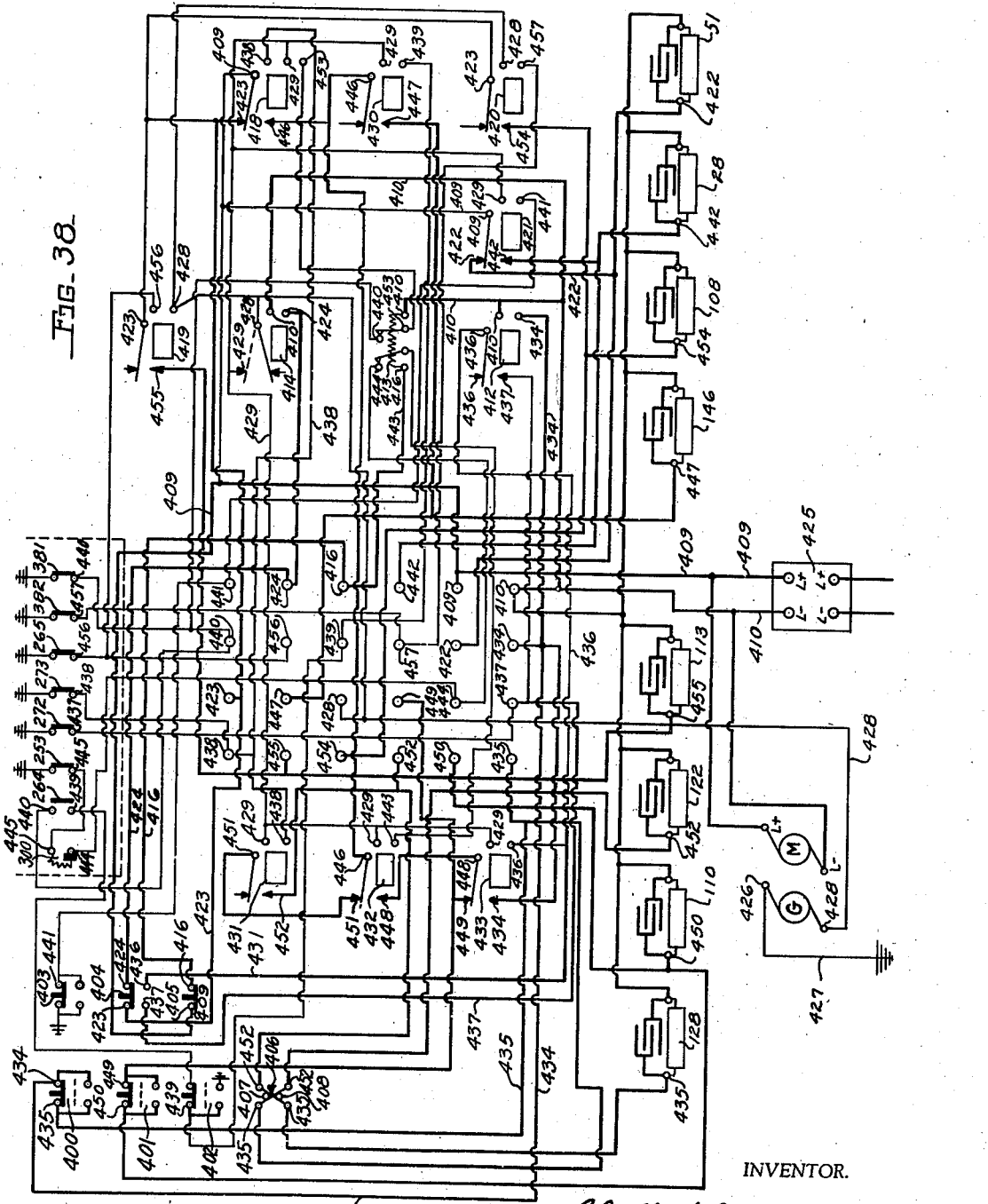

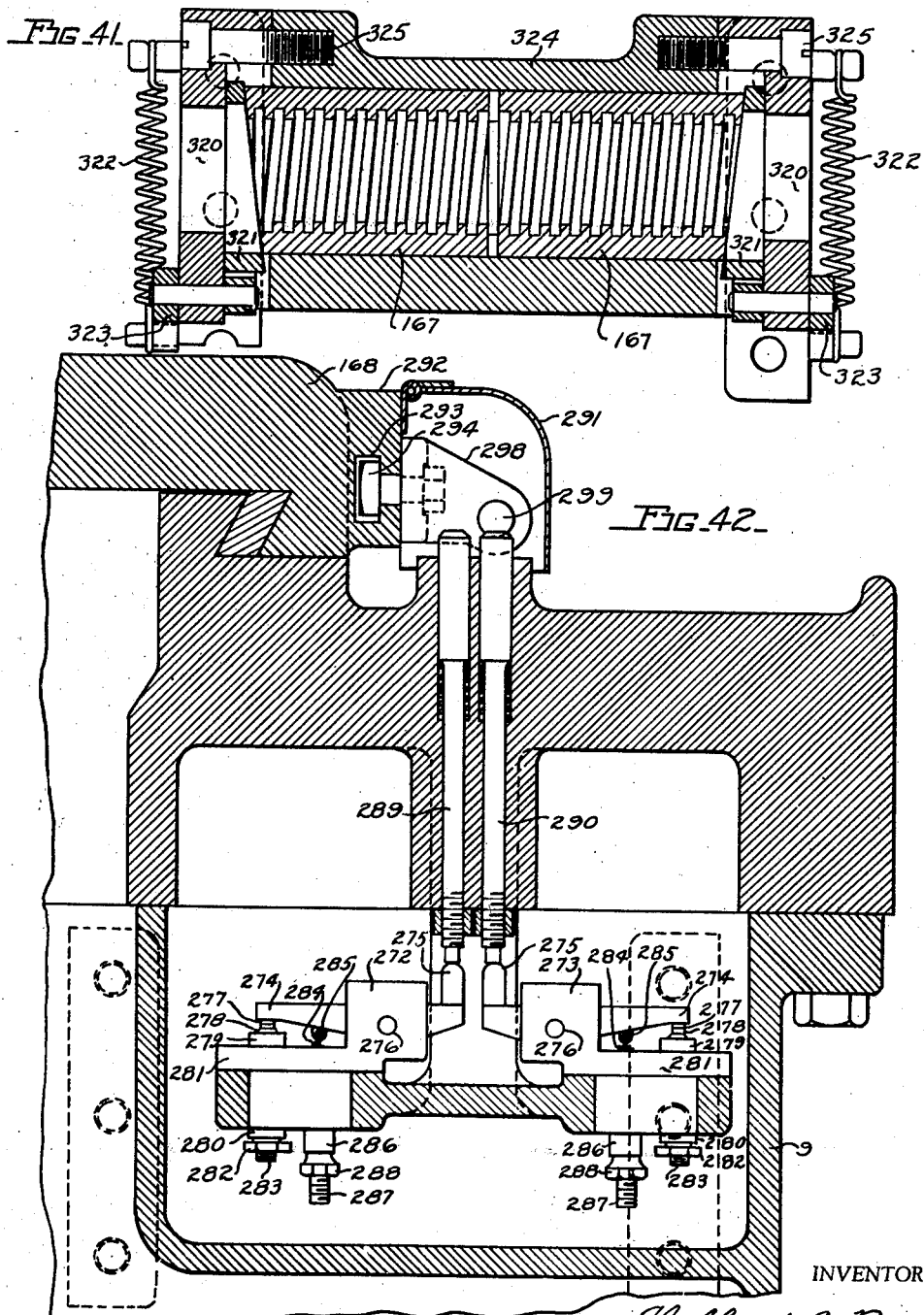

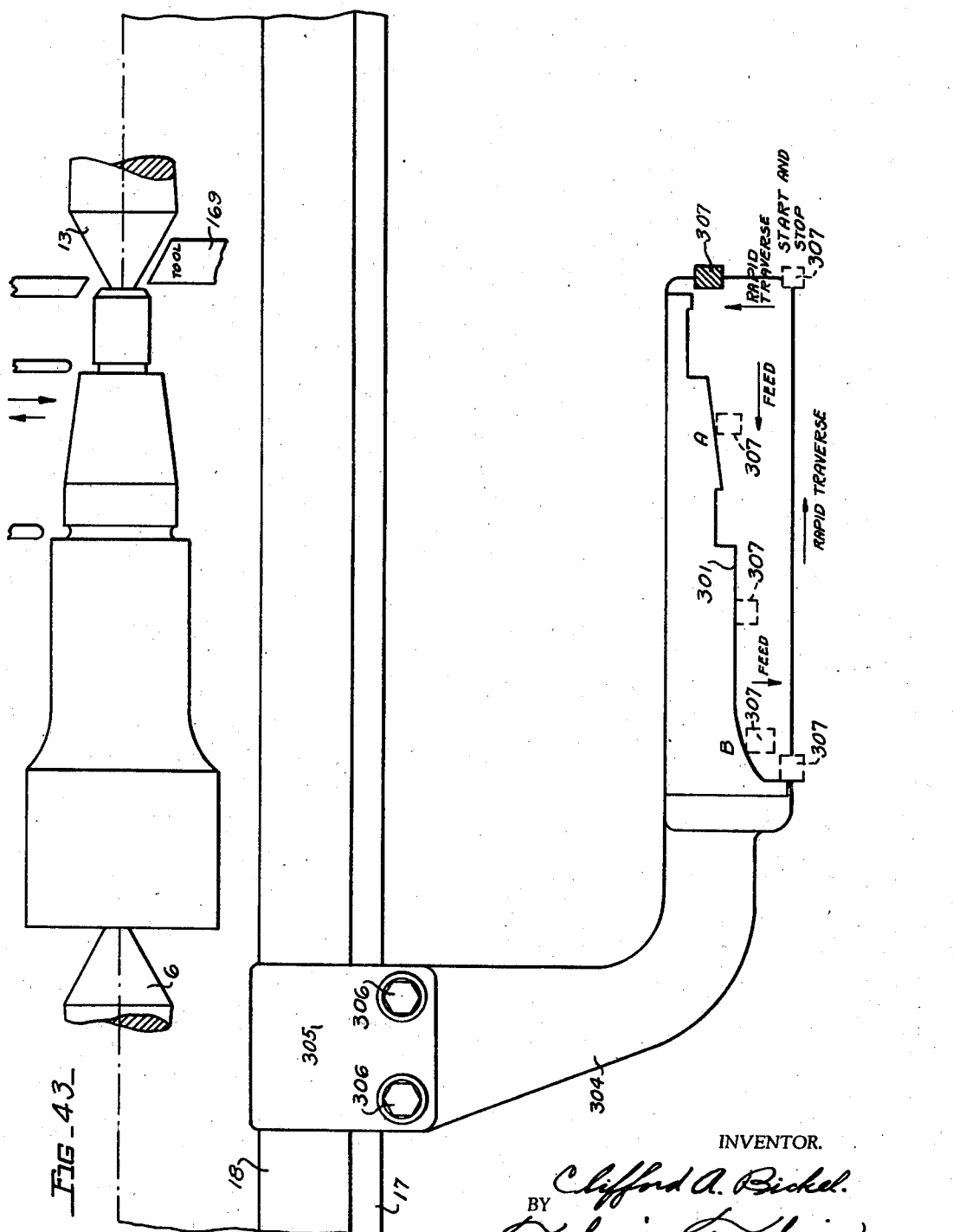

Patented Aug. 25, 1936

2,052,441

UNITED STATES PATENT OFFICE 2,052,441

APPARATUS FOR CONTROLLING OPERATION OF TOOLS

Clifford A. Bickel, Sidney, Ohio, assignor to The Monarch Machine Tool Company, Sidney, Ohio, a corporation of Ohio Application October 20, 1933, Serial No. 694,501

46 Claims. (Cl. 82—2)

This invention relates to machine tools, and especially to methods and apparatus for automatically controlling the operations of machine tools.

It is an object of my invention to provide a method of controlling the motions of a machine tool automatically by electrical means controlled by a guiding member of suitable configuration.

Another object is to provide a machine tool and a control system therefor, whereby the machine tool is adapted automatically to cut various configurations upon work pieces.

Another object is to provide such a machine tool with a carriage capable of a quick reversal of the inward cross-feed and rapid traverse of the outward cross-feed.

Another object is to provide an electrical system of control for such a carriage whereby the feeding movements of the carriage are guided by a standard pattern operatively connected therewith.

Another object is to provide a double carriage automatic lathe wherein the front carriage tool slide cycle is capable of quick reversal by electrical means guided and set in motion by the configurations of a guiding member such as a template or cam.

Another object is to provide a lathe wherein the longitudinal and transverse feeds are controlled by a template follower switch engaging a template, the opening and closing of which switch operates the transverse and longitudinal feeds alternately.

Another object is to provide a double carriage automatic lathe wherein the feeding action of the rear carriage is started by electrical means set in motion by the front carriage.

Another object is to provide electrical means for interchanging the electrical connections of the cross slide actuating means whereby the actuating means for moving the cross slide in one direction may be individually controlled by the controlling apparatus normally actuating the cross slide in the opposite direction.

Another object is to provide mechanical means of reversing the direction of rotation of the cross slide mechanism whereby the in-feed actuating means will produce an out-feed effect and vice versa.

In the drawings:

Figure 1 is a front elevation of the machine tool of my invention.

Figure 2 is a top plan view thereof.

Figure 3 is a left end elevation thereof.

Figure 4 is a longitudinal section through the headstock drive pulley and pump shaft of my machine tool, using a hand clutch instead of a magnetic clutch.

Figure 5 is an enlarged section along the line 5—5 of Figure 2, showing the main drive shaft.

Figure 6 is a section along the line 6—6 of Figure 2, showing the headstock gear box.

Figure 7 is a vertical section through the headstock gearing, with the various shafts and gears thereof laid out side by side in order to show their operative connections.

Figure 8 is a section along the line 8—8 of Figure 1, showing the tailstock mechanism.

Figure 9 is a section along the line 9—9 of Figure 8, through the tailstock.

Figure 10 is a side elevation of the tailstock.

Figure 11 is a section on the line 11—11 in Figure 1, showing the mechanism of the front gear box.

Figure 12 is a section through the front gear box with the shafts, gears, and clutches laid out side by side to show their operative connections.

Figure 14 is a section along the line 14—14 of Figure 2, showing the front lead screw box and brake.

Figure 15 is an end elevation of the mechanism of Figure 14.

Figure 16 is an end elevation of the rear feed rod box.

Figure 17 is a front elevation of the rear feed rod box.

Figure 18 is a section along the line 18—18 of Figure 2, showing the rear gear box mechanism.

Figure 19 is a section along the line 19—19 of Figure 2 through the rear gear box.

Figure 20 is a front elevation, partly in section, of the front carriage and adjacent structure.

Figure 21 is a side elevation, partly in section, of the front carriage and its connections.

Figure 22 is a top plan view of the front portion of the front carriage and its neighboring structure.

Figure 23 is a vertical transverse section through the front carriage along the line 23—23 of Figure 20.

Figure 24 is a transverse section through the cross slide mechanism of the front carriage along the line 24—24 of Figure 23.

Figure 25 is a horizontal section through the front carriage driving mechanism along the line 25—25 of Figure 20.

Figure 26 is a top plan view of the rear carriage with a portion of the cover removed, showing a portion of the oiling system in dotted lines.

Figure 27 is a longitudinal section along the line 27—27 of Figure 2, through the rear carriage.

Figure 28 is a transverse section along the line 28—28 of Figure 2, through the rear carriage.

Figure 29 is an enlarged view of a portion of Figure 10, showing the means of oiling the carriage ways.

Figure 30 is a longitudinal section through one of the metering oil connections.

Figure 31 is a section through one of the limit switches.

Figure 32 is a front elevation of a precision stop switch.

Figure 33 is a side elevation of the precision stop switch shown in Figure 32.

Figure 34 is a front elevation of another precision stop switch, namely the template follower switch.

Figure 35 is a side elevation of the precision stop switch shown in Figure 34.

Figure 36 is a front elevation of the electrical control switch panel.

Figure 37 is an enlarged fragmentary view of a portion of Figure 21, showing the manner of conducting electric current from the stationary frame of the machine tool to the movable front carriage.

Figure 38 is a wiring diagram showing the electrical connections of the various magnetic clutches, electrical switches, relays and operators with the power line and dynamotor.

Figure 40 is a diagrammatic representation of the relationship between the electrical and mechanical apparatus of the rear carriage.

Figure 41 is an enlarged longitudinal section through the longitudinal lead screw nut of the front carriage, taken along the line 41—41 of Figure 21.

Figure 42 is an enlarged longitudinal section through the front transverse limit switches, taken along the line 42—42 of Figure 22.

Figure 43 is a diagrammatic representation of the operation of the template and follower switch machining curvedly-stepped and obliquely-stepped (or tapered) work pieces.

General construction

Figure 39:
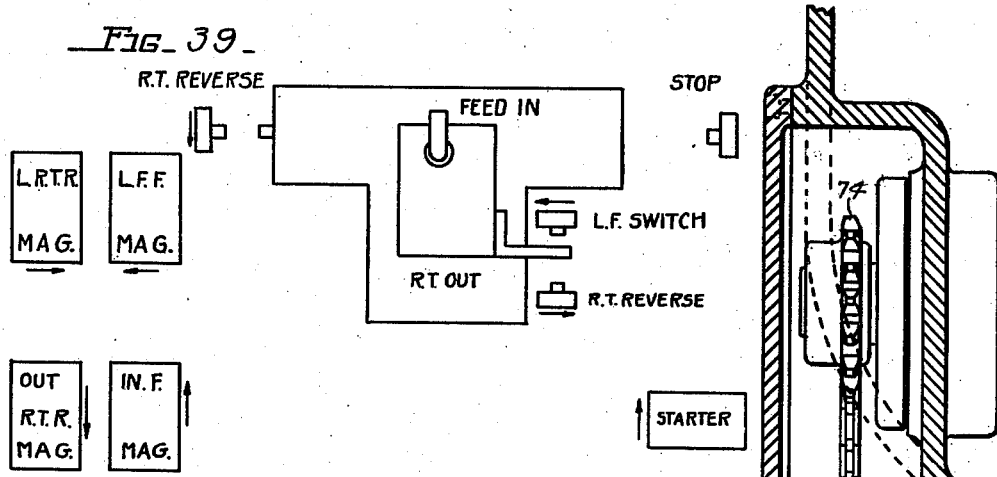
Figure 39 is a diagrammatic representation of the relationship between the electrical and mechanical apparatus of the front carriage.

Referring to the drawings in detail, Figure 1 shows the machine tool of my invention, having hollow base legs 1 and 2 supporting the intermediate pan 3. The hollow base legs 1 and 2 contain louvre panels 4 adapted to provide ventilation for the interior. The machine tool is provided with the headstock, generally designated 5, having the headstock center or live center 6 whereby the work piece is rotated. The headstock 5 is provided with change-speed gearing actuated by the headstock gear shift lever 7. The machine tool is likewise provided with a front gear box, generally designated 8 (Figure 2), the mechanism of which communicates with the front carriage, generally designated 9, through the front lead screw 10 and the front feed rod 11. Opposed to the headstock center or live center 6 is the tailstock, generally designated 12, having the tailstock center or dead center 13.

My machine tool is likewise provided with a rear carriage, generally designated 14, and a rear gear box, generally designated 15, with connections therebetween through the rear feed rod 16.

The machine tool of my invention is provided with a bed plate 18, upon which the front carriage 9 and the rear carriage 14 reciprocate along ribbed ways 17. The left-hand end of the machine is provided with a clutch contained in the clutch guard 19.

Main driving mechanism

The base leg 2 of my machine tool contains the main motor 20 provided with the multiple V-grooved pulley 21. Engaging the pulley 21 are V-belts 22 which transmit power to the multiple V-grooved pulley 24 by engaging its V-grooves 23. (Figure 5). This pulley is provided with collecting rings 25 which are in contact with the brushes 26 mounted in the brush holder 27. On the opposite face of the pulley 24 is the clutch magnet 28 fastened thereto by the machine screws 29. The latter also serve to hold the clutch friction disk 30 which has contacting engagement with the front face of the intermediate disk 31, the back face of which is engaged by the braking disk 32 mounted on the brake magnet 51 which is bolted to the housing 34. (Figure 5.)

The intermediate disk 31 is attached to the shaft 36 by means of the key 35, this shaft 36 supporting the bearings 37 whose outer races rotatably support the pulley 24 on its sleeve 38. The sleeve 38 carriers double sprockets 39 and 40, likewise on the sleeves 38. The sprocket 39 drives the sprocket 42 operating the mechanism in the rear gear box 15 by means of the driving chain 41, whereas the sprocket 40 drives the sprocket 44 on the front gear box 8 by means of the chain 43.

Headstock mechanism

The headstock gearing, shafts and related mechanism (Figure 7) receive power from the pulley shaft 36 which is supported in the casing by the bearings 33. The pulley shaft 36 contains the triple sprocket 46 which drives the drive chain 47 and transmits power to the spindle sprocket 48 mounted upon the first intermediate shaft 49. The latter is supported by antifriction bearings 50 placed in the casing. The first intermediate shaft 49 carries the pick-off pinion 52 which meshes with the pick-off gear 53 on the second intermediate shaft 54, these gears being covered by the pick-off gear casing 55. (Figure 7.) The second intermediate shaft 54 is rotatably supported by the antifriction bearings 56 and 57, and is provided with a fixed key 58 upon which a sleeve having a pinion 59 and a gear 60 integral therewith is slidably mounted, the two being moved simultaneously by the shifter 61 which is engaged by the gear shifting yoke 62. The latter is mounted upon the shaft 63 and operated by the gear shifting lever 7 outside the casing. (Figure 1.) The right-hand end of the shaft 54 is mounted in the antifriction bearing 65.

The pinion 59 (Figure 7) at one end of the sliding movement of the sleeve meshes with the gear 66 keyed to the spindle shaft 68 which carries the live center 6 providing rotation for the work piece, while at the other end of said sliding movement, the gear 60 meshes with the pinion 67 likewise keyed to the spindle shaft 68 which also carries the worm 69. (Figures 6 and 7.)

This worm 69 meshes with a worm gear 71 (Figure 6) keyed to the cross shaft 70. The latter provides power drive for the front and rear carriages through the medium of the sprockets 74 and 75 respectively, and is supported at either end upon antifriction bearings 72 and 73.

*Front gear box*

The front gear box (Figure 12) contains an assembly of clutches and gears for actuating the front lead screw 10 or front feed rod 11 selectively at either a feeding speed or a rapid traverse speed, as desired. In brief, the portion of the mechanism to the left of the section line 11—11 in Figure 12 contains clutches and gears adapted to give a rapid traverse speed to the elements 10 and 11, and is driven by the sprocket 44 which is, in turn, driven by the chain 43 from the double sprocket portion 40 (Figure 5) in the main driving mechanism. The portion of the mechanism to the right of the section line 11—11 in Figure 12, however, contains clutches and gears adapted to give a feeding speed to the front lead screw 10 or front feed rod 11, and is driven as will be seen below, by the bevel gear 89. The bevel gear 89 is driven from the main driving mechanism (Figure 5) through the head stock mechanism (Figure 6), to the sprocket 74 on the cross shaft 70, and thence by mechanism to be described.

Figure 13:
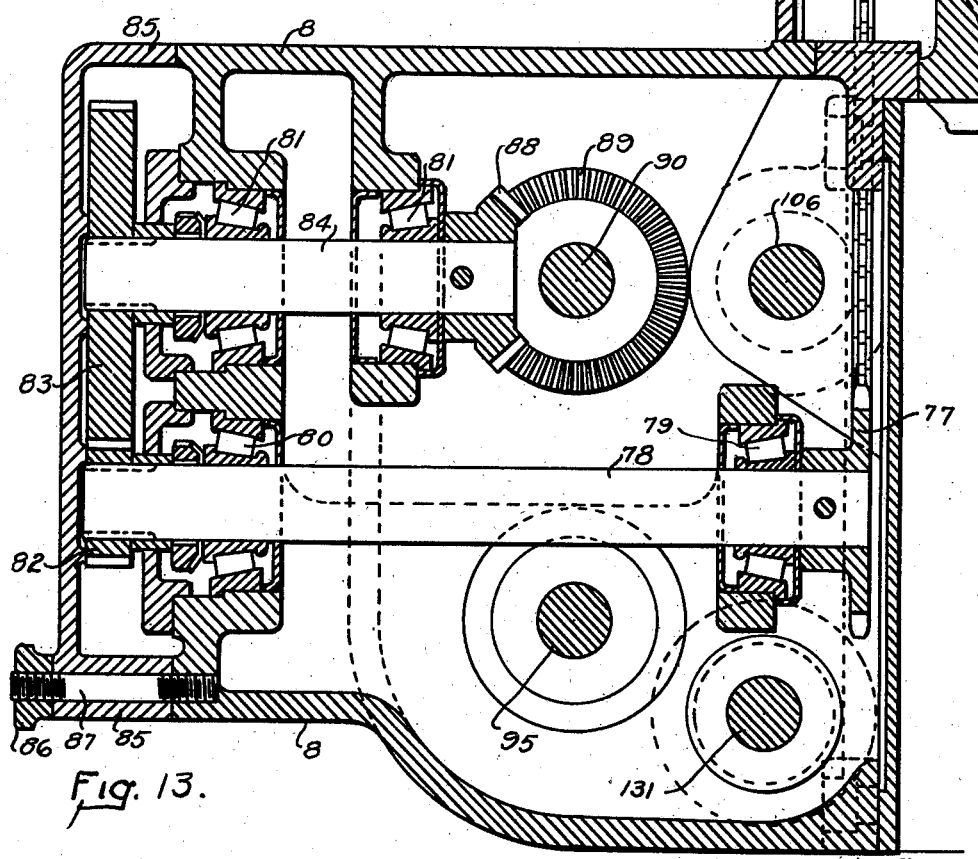
Figure 13 is a section along the line 13—13 of Figure 2, showing the front gear box mechanism.

The front gear box (Figures 11, 12 and 13) receives power from the chain 76 and the sprocket 74, (Figure 6) these driving the sprocket 77 on the lower change gear shaft 78. The latter is supported in antifriction bearings 79 and 80 in the front gear box casing 8 (Figure 13), and carries a pick-off pinion 82 meshing with a pick-off gear 83 on the upper change gear shaft 84. Access to these pick-off gears 82 and 83 is obtained by removing the nuts 86 on the stud screws 87 which clamp the front pick-off gear casing cover 85 to the front gear box casing 8. The upper change gear shaft 84 is mounted in the spaced antifriction bearings 81 and carries a beveled pinion 88 which meshes with the bevel gear 89 on the longitudinal magnet shaft 90. (Figure 13.)

The longitudinal magnet shaft 90 with its bevel gear 89 is mounted in the antifriction bearings 91 and 92 (Figure 12) and carries a gear 93 which meshes with the gear 94 on the cross feed magnet shaft 95 mounted in the antifriction bearings 96 and 97. (Figure 12). The longitudinal magnet shaft 90 carries the forward feed longitudinal magnet 110 having a collector ring 98 engaging the brushes 99 and 100. This magnet 110 is provided with an armature plate 103 which is mounted upon a head 101 (Figure 12) on the armature shaft 102. Keyed to the armature shaft 102 is the pinion 104 which meshes with the gear 105 that is mounted on the lead screw jack shaft 106. The latter is connected to the lead screw 10, and is supported in spaced antifriction bearings 107 in the gear box casing.

The pinion 104 on the armature shaft 102 is also keyed to the armature shaft 109 which carries the armature plate 111. The latter is engaged by the rapid-traverse longitudinal shaft magnet 113 which is mounted on the rapid-traverse longitudinal shaft 112 and driven by the sprocket 44 keyed thereto. The sprocket 44 is driven at a rapid traverse speed by the chain 43 from the sprocket 40 of the main driving mechanism (Figure 5), as previously described. The rapid-traverse longitudinal shaft 112 is mounted on the anti-friction bearings 114 and carries the gear 115, the latter meshing with the gear 116. The rapid-traverse longitudinal shaft magnet 113 carries the collector ring 117 engaging the brushes 118 and 119.

The gear 116 is mounted on the rapid traverse tool slide shaft 120 supported in the spaced bearings 121. On this shaft 120 is mounted the rapid traverse tool slide magnet 122, which carries the collector ring 123 engaging the brushes 124 and 125. The magnet 122 also is engaged by the armature plate 126 connected to the armature shaft 127. Keyed to the latter is the pinion 129 which meshes with the gear 130 on the feed rod jack shaft 131. The latter carries the pinion 132 meshing with the feed rod gear 133 mounted on the feed rod 11 (Figure 12). The pinion 129 is also keyed to the armature shaft 134 having the armature plate 136 engaging the transverse feed-in magnet 128 mounted on the cross-feed magnet shaft 95 and carrying the collector ring 137 engaged by the brushes 138 and 139. The pinions 104 and 129 and their armature shafts are mounted in ball bearings 140 in the partition 141 of the gear box casing. The latter (Figure 11) is provided with the removable front plate 135 bolted thereto. The removal of this plate permits the easy removal of the entire assembly of magnets, shafts and associated gearing without disturbing the remainder of the machine tool.

*Rear gear box*

The rear gear box receives power from the sprocket 75 on the cross drive shaft 70 (Figure 6) by way of the chain 142 engaging the sprocket 143 mounted on the shaft 144 (Figure 19). The latter is supported by spaced antifriction bearings 145 mounted in the rear gear box casing 15, and carries a pick-off gear 147 which meshes with the pick-off pinion 148 carried on the shaft 149, to which access is obtained by the removal of the pick-off housing 151. The shaft 149 is supported by the spaced antifriction bearings 150, and also carries a beveled pinion 152 meshing with the pinion 153 on the cross feed-in magnet shaft 154 (Figure 18), carrying the cross feed-in magnet 146. This magnet 146 carries a slip ring 155 engaging the brushes 156 and 157. The cross feed-in magnet 146 has an armature plate 158 mounted on the armature shaft 159 to which is keyed the pinion 160 carrying the armature shaft 161 and the armature plate 162. The cross feed rapid-traverse out magnet 108 engages the armature plate 162 (Figure 18) and is mounted upon the cross feed traverse out shaft 163. The pinion 160 meshes with the gear 164 on the rear feed rod 16. The cross feed traverse out shaft 163 carries the sprocket 42 engaging the chain 41 whereby the feed rod 16 can be driven in opposite directions to move the tool slide on the rear carriage transversely in or out. The shaft 163 is thus driven at a speed suitable to impart a feeding speed to the rear feed rod 16, whereas the shaft 154 is driven at a speed suitable for rapidly traversing the rear carriage by means of the rear feed rod 16. The cross feed traverse out shaft 163 is connected by the coupling 165 to the oil pump 166 which provides circulation of the force fed lubricant to the work and tools.

*Front carriage mechanism*

The front carriage and its mechanism (Figures 20, 21, 22, 23 and 25) are moved longitudinally by the lead screw 10 (Figures 21 and 25) engaging the nut 167. The lead screw 10 determines the longitudinal motion of the front carriage, and this motion is controlled and limited by the electrical mechanism hereinafter described. The relative speeds of the lead screw 10 are controlled by the front gear box and the headstock mechanism already described. The transverse motion of the tool slide 168 and its tool 169 (Figure 21) of the front carriage is determined by the feed rod 11. The latter passes loosely through the bevel gear 170 which meshes with the bevel pinion 171 on the transverse jack shaft 172 (Figure 25), having a double sprocket 173 driving a chain 174 (Figures 20 and 25). The chain 174 transmits power to the sprocket 175 mounted on the tool slide actuating shaft 176 having the screw 177 engaging the nut 178 carried by the tool slide 168. The last described mechanism causes the cross-feed tool slide 168 to move in or out.

The direction of rotation of the transverse jack shaft 172 carrying the sprocket 173 (Figure 25) may be reversed by means of the bevel gear 180, also loosely mounted on the feed rod 11, and also engaging the bevel gear 171 mounted on the transverse jack shaft 172. The power is transmitted from the feed rod 11 to either of the bevel pinions 170 or 180 by means of the sliding clutch member 181 which is movable to and fro longitudinally to engage either of the bevel pinions 170 or 180 as desired. This clutch member 181 is mounted on the sleeve 182 (Figure 25) which in turn is drivingly connected to the feed rod 11 by the key 183. The clutch member 181 is provided with teeth 184 which engage corresponding teeth 185 or 186 on the hubs of the beveled pinions 170 or 180 respectively. The sliding clutch member 181 is drivingly connected to the sleeve 182 by the key 187, along which it slides, under the influence of the yoke 188 which is carried by the yoke shaft 189 (Figure 23) mounted in bearings 190 and 191 in the front carriage housing. The forward end of the yoke shaft 189 is provided with the shifting lever 191 (Figure 20), which engages a quadrant 192 in any one of the three positions, respectively determining whether the clutch member 181 shall be in neutral (as shown in Figure 25), or operatively engaging the pinion 170 to give the shaft 172 a forward direction, or the pinion 180 to give a reverse direction of rotation. The feed rod 11 and the adjacent mechanism which it actuates in the front carriage are rotatably mounted in antifriction bearings 193 and 194 (Figure 25). The transverse jack shaft 172 is similarly mounted in antifriction bearings 195 and 196, access being given thereto by the removal of the detachable plate 197. The transverse jack shaft 172 is provided at its inner end with an enlarged portion 198 and at its outer end by a removable retainer 199. Similarly, the sleeve 182 has an enlarged portion 200 on one end and a removable retainer 201 secured to its opposite end. The sleeve 182 adjacent to the retainer 201 carries the cam 202 (Figure 25) which engages the bell crank 203 (Figure 20) mounted upon the fulcrum shaft 204. The opposite end 205 of the bell crank 203 engages an annular slot 206 in the pump shaft 207 which is reciprocably mounted in the brackets 208 and 209. The brackets 209 also support the pump cylinder 210 having an outlet conduit 211. The pump shaft 207 is provided with a collar 212 engaged by the coil spring 213 which forces it in one direction. As the feed rod 11 rotates (Figure 20), the cam 202 rotates eccentrically, causing the bell crank 203 to shift to and fro, the lower end 205 thereof causing the pump shaft 207 to reciprocate. The coil spring 213 causes the bell crank to be maintained in engagement with the cam 202. As the pump shaft 207 reciprocates, it pumps oil outward through the outlet conduit 211, this oil being fed to the various parts of the carriage by suitable tubing. The pump cylinder 210 and its adjacent parts are enclosed by the cover plate 214 attached to the bottom 215 of the front carriage casing, the latter acting as a sump to contain lubricating oil.

The lubricant is pumped to a suitable distribution manifold 216 for each carriage, the one for the rear carriage being shown in Figure 26; the distribution manifold for the front carriage is substantially the same as that for the rear carriage. Leading from the distribution manifold 216 (Figure 26) are the individual feed pipes 217, 218, 219, 220 and 221, each of which contains a metering oil connection 222.

Each metering oil connection 222 (Figure 30) contains a bore 223 having a conical flare 224 leading into an enlargement 225 containing filter wads 226. The filter wads 226 are held in place by the end of the oil pipe 221, which is maintained in position by an enlarged portion 227 nesting into an annular collar 228 resting against one end of the metering oil connection 222. The latter is provided with a threaded portion 229 which is engaged by a threaded collar 230 serving to hold the enlarged portion of the oil pipe 221 against the internal collar 228 and the latter against the end of the casing of the metering oil connection 222.

The small bore 223 of the metering oil connection 222 contains a restriction pin 231 fitting loosely therein and having a disk 232 integral therewith for reciprocation in a countersunk bore 233 against the action of a coil spring 234 held in place by a plug 235. The restriction pin 231, the disk 232 and the spring 234 thus together constitute a valve serving to meter out the oil in suitable amounts when the working conditions demand it.

The carriage ways are lubricated in the manner shown in Figure 29. This comprises a pipe 236, through which lubricant passes from the oil distributing system to the ways as shown. In this manner, the ways receive lubricant through a metering oil connection (Figure 30), whenever the working conditions demand it.

The details of the lubricating system form no part of the present invention, hence are not further discussed.

The rear carriage is lubricated by a reciprocating oil pump similar to that used in the front carriage, and likewise situated at the bottom of the carriage. (Figures 27 and 28). Accordingly, the same numerals are used for the corresponding parts in the pumps of both carriages.

Returning to the front carriage mechanism again, it will be seen from Figures 21 and 23 that the cutting tool 169 is mounted in a cutter head 237 by means of the bolts 238 and the screw 242. The cutter head 237 is itself reciprocable longitudinally for adjustment purposes in the beveled ways 239 and the T-groove 240, the adjustment being tightened by means of the bolt 241 operating against the beveled ways 239 of the base plate 243 which in turn is engaged by the screw 244 passing therethrough and threadedly connected to the nut 245 which rests in the T-slot 240.

When the bolt 241 is tightened, the cutter head 237 and its base plate 243 are rigidly locked into fixed relationship with the cross slide 168. (Figure 23).

The cross slide 168 carries the nut, generally designated 178 (Figure 23), joined thereto by the screws 247. (Figures 23 and 24.) The nut 178 consists of a central portion 246 and end caps 248 bolted thereto by the screws 249 and containing the movable contact member 250. The latter is held in position against the cross feed screw 177 by the coil springs 251. The two-piece nut 178 thus provides for the automatic takeup of wear. The cross slide 168 moves in or out upon the ways 252 (Figure 24) when the cross feed screw 177 is rotated.

The movements of the front carriage feeds longitudinally right or left and the tool slide transversely in or out are controlled by the previously described magnetic clutches, whose actuation is controlled by a plurality of switches which are opened and closed by the movements of the carriage. The front carriage contains six such switches, and the rear carriage two thereof. On the left hand end of the front carriage (Figure 20) is located the front-left-feed switch 253 which is seen more in detail in Figures 32 and 33. The push button of the switch 253 is engaged by the limit stop arm 254 (Figure 20) which projects from the adjustable stop 255, attached by the bolt 256 to the longitudinal stop shaft 257.

Consequently when the front carriage moves sufficiently to the left that the push button of the switch 253 is engaged by the stop arm 254, the switch contact is thrown into open circuit, as hereinafter described.

The stop shaft 257 also carries an adjustable stop 258 near the stop 255. The stop 258 is clamped to the stop shaft 257 and carries a stop arm 259 longitudinally adjustable relative thereto by the screw 260. The stop arm 259 at its free end has a beveled portion 261 (Figure 20) which engages the roller 262 on the contact arm 263 of the rear carriage pick-up switch 264. Consequently, when the carriage arrives at a point opposite the beveled portion 261 of the stop arm 259, the roller 262 will be forced upward by the beveled portion 261, shifting the contact arm of the rear carriage pick-up switch 264, causing the rear carriage to come into action as will be described later.

The righthand end of the front carriage (Figure 20) carries the front right feed switch 265 having the roller 266 mounted on its contact arm 267. Mounted on the stop shaft 257 is the adjustable stop 268 which may be clamped in fixed position thereon by the bolt 269, in a similar manner to the stop 255 previously described. The stop 268 carries the adjustable stop arm 270 which has a beveled portion 271 adapted to engage the roller 266 of the front-right-feed switch 265. Consequently, when the front carriage moves sufficiently far to the right, the roller 266 and with it the contact arm 267 of the front-right-feed switch 265 will be forced downward by the beveled portion 271 of the stop arm 270, shifting the switch contacts in a manner hereinafter described. The stop shaft 257 is held by a stop shaft bracket 302 which is clamped to the machine frame as by the bolts 303.

The transverse feed of the front carriage is likewise provided with a pair of switches 272 and 273 for controlling the limits of movement in and out. These switches are shown in detail in Figures 32 and 33. Each consists of an arm 274 having a follower button 275 at one end, a fulcrum screw 276 in its intermediate position, and a contact member 277 at its opposite end. The contact member 277 engages a corresponding contact member 278 mounted on a holding rod 279 which passes through a bore 280 in a switch base 281 and is secured thereto by the nut 282 engaging the threaded portion 283 thereof. The mid-portion of the switch arm 274 is engaged by a coil spring 284 which is connected thereto as at 285 and is carried within the barrel 286. On its opposite end, the spring cylinder 286 carries the threaded screw 287 and the nut 288 thereon. (Figure 33.) It will be obvious that, if the follower button 275 is pushed inward, the contacts 277 and 278 will be separated, thus breaking the electrical circuit between the arm 274 and the contact rod 279, these being electrically insulated from one another.

The front-in feed switch 272 and the front-out feed switch 273 are both contained in the right hand mid-portion of the interior of the front carriage (Figure 20), their switch arms 274 being horizontal and their follower buttons 275 pointing upward. The follower button 275 of the front-in feed switch 272 is engaged by a vertical push rod 289, whereas that of the front-out feed switch 273 is correspondingly engaged by a vertical push rod 290. (Figures 42 and 21.)

The upper ends of the push rods 289 and 290 have bearing support in the tool slide casing, and project upward into the interior of the cross slide stop housing 291. The latter is supported against the stop base 292 which is provided with a T-shaped slot 293 containing a T-bolt 294, the opposite end of which engages the out-stop 295 carrying the in-stop arm 296.

In a similar manner, the stop base 292 likewise carries the T-bolt 297 clamping thereagainst, the out-stop 298 having the out-stop arm 299. The ends of both the out-stop and in-stop arms 296 and 299 are conical, and are thereby adapted to engage the upper ends of the push rods 289 and 290 and force them downward when such engagement occurs.

As the cross slide 168 moves backward under the influence of its screw 177, the in-stop arm 296 moves backward and at the backward limit of motion engages the push rod 290. The latter is forced downward, throwing open the switch contacts of the front-in feed switch 272.

In a similar manner, when the cross slide 168 moves outward to its limit of motion, the out-stop arm 299 will engage and force downward the push rod 290, throwing open the front-out feed switch 273. By adjusting the two stop arms 296 and 298, the forward and rearward motion of the cutting tool 169 may be accurately controlled. (Figure 21.)

The front carriage is additionally provided with a template follower switch 300 mounted on its upper left-hand super-structure (Figures 20, 21 and 22). This switch controls the successive longitudinal and transverse feeds when work consisting of steps is to be machined. The operation of the switch is guided by a guiding member or template 301 (Figures 20, 21 and 22) attached to the template bracket 304 which is secured to the machine frame by the clamping portion 305 and the bolts 306. The template arm 304 is thus adjustable longitudinally by loosening the bolts 306.

The switch 300 (shown in detail in Figures 34 and 35) is similar, in general, to the switches 253, 272 and 273 shown in Figures 32 and 33.

The template follower switch 300 has a slightly different follower button 307, but a similar arm 274, fulcrum bolt 276, fixed contact points 278, fixed contact base 279 secured in the bore 280 of the switch base 281 by the nut 282 engaging the threaded portion 283; also having the coil spring 284 attached at 285 to the switch arm 274 and secured in the cylinder 286 having the nut 288 operating on the screw 287. The switch 300, however, has its movable contact 311 secured to a pin 308 mounted in an insulated body 309 so that current may reach the movable contact 277 through the rod 308 by passing through the conductor 310 without reaching or passing through the switch arm 274. In this way the current reaching the movable contact 311 is completely independent of the current passing through the frame of the machine.

The template follower switch 300 is secured by the clamp member 312 to the switch supporting shaft 313, the switch 300 being movable in or out along the former by loosening the clamping bolt 314. (Figures 20 and 22.) A finer adjustment of this nature, however, is provided by the knurled collar 315 operating on the threaded portion 316 of the switch supporting shaft 313, which passes through and is supported by the switch supporting shaft bracket 317 and held in place by the thumb screw 318.

Thus the template may be adjusted longitudinally relative to the switch by loosening the template clamping bolts 306, and the switch adjusted transversely relative to the template by turning the knurled collar 315. In this way the template 301 and the template follower switch 300 may be brought into the desired alignment with one another, and the follower button 307 of the switch 300 made to reach the stepped portions 319 of the template 301 at exactly the desired time. As has been previously described, the cutting tool 169 may be adjusted in the cutter head 237 by loosening the bolts 238 and adjusting the screw 242. The cutter head 237 is moved longitudinally relative to the work by loosening the screw 241 which engages the beveled longitudinal ways 239 upon which the cutter head 237 slides longitudinally of the work.

The longitudinal feed nut 167 (Figure 21) engaging the longitudinal feed lead screw 10 constitutes an automatic wear take-up device in the form of a split two-piece nut similar in principle to the two-piece nut 178 on the cross feed screw 177. It consists of a movable cam 321 which is held in contact with the lead screw 10 by the action of the coil spring 322 (Figures 41 and 21), operating through the intermediate agency of the arm 323. The various portions of the nut 167 are supported on the plate 324 which in turn is secured to the carriage by the screws 325. As wear occurs between the nut and screw, the cam 321, which is held in place by the spring 322, will move the nut parts endwise. This forces the nut parts against the screw thus taking up the clearance between the two.

Electricity is conducted to the various switches on the front carriage from the frame of the machine tool in the manner shown in Figures 21 and 37. Mounted upon the machine frame is a plurality of conductor bars 326, 327, 328, 329, 330 and 331. Contact is made with these conductor bars by means of the brushes 332, 333, and 334, the latter being electrically connected to the various switches. Other brushes, similar to the brushes 332, 333 and 334, conduct electricity to the remaining switches from the conductor bars 327, 329 and 331. Thus it will be seen that, as the front carriage moves longitudinally relative to the frame, electrical contact therebetween will nevertheless be maintained through the action of these brushes upon the conductor bars.

*Rear carriage mechanism*

The rear carriage mechanism (Figures 26, 27 and 28) in many respects resembles that of the front carriage. The rear carriage receives power from the rear feed rod 16 (Figures 27 and 28) through the agency of the sliding beveled pinion 340 which operates the beveled pinion 341 on the jack shaft 342. The latter is mounted upon anti-friction bearings 343 and 344, in which it is held by its enlarged head 345 and threaded collar 346 engaging its threaded portion 347. (Figure 28.)

The beveled pinion 340 is attached to the sleeve 348 which engages the splines 349 in the feed rod 16 through the sliding keys 350. The entire assembly is supported upon antifriction bearings 351 and 352. (Figure 27.)

The jack shaft 342 carries a cam 353 which actuates the lubricating pump for the rear carriage in a manner similar to the action of the lubricating pump, as previously described. The essential elements of the rear carriage pump mechanism are, therefore, given the same descriptive numerals as those of the front carriage pump mechanism. (Figures 20 and 27.)

The jack shaft 342 carries a pinion 354 (Figure 28) which engages the intermediate gear 355 which rotates upon the stub shaft 356. The latter is held in position by the nut 357 engaging the threaded portion 358 thereof. The intermediate gear 355 meshes with and transmits power to the pinion 359 which in turn is operatively connected to the rear carriage cross feed screw 360. The latter is supported in a conventional manner and contains the usual hand wheel 361 operatively connected therewith for rotating the cross feed screw 360 manually. The amount of rotation is indicated by the dial 362 and the index needle 363, this being usually graduated in thousandths of an inch of cross feed.

The rear carriage cross slide 364 receives power from the rear carriage cross feed screw 360 by the two-piece take-up nut 365. As this nut is similar in construction and operation to the front carriage cross-feed take-up nut 178, a description will not be repeated. The nut 365 is held in position against the rear carriage cross slide 364 by the bolt 366 passing therethrough. A slot 367 is provided in the cross slide 364 for the reception of a tool post or cutter head in the usual way. (Figure 28.)

The rear carriage cross slide is provided with a stop shaft 368 to which the switch stops 369 and 370 are adjustably attached, as by the clamping screws 371 and 372 respectively. (Figures 26 and 28.) The switch stop 370 is provided with a fine adjustment consisting of the screw 373 attached thereto and engaging the knurled nut 374 rotating in the switch stop base 375. The latter is locked in position on the stop shaft 368 by the screw 376.

Fixedly secured to the rear carriage is the push rod guide post 377 (Figures 26 and 28), in which reciprocate vertically the switch push rods 379 and 380. The upper ends of these push rods 379 and 380 are adapted to be engaged by the switch stops 369 and 370, whereas the lower ends communicate respectively with switches 381 and 382. The switch 381 will be designated as the rear carriage in-feed stop switch, and the switch 382 the rear carriage out-feed stop switch.

The rear carriage stop switches 381 and 382 are shown in detail in Figure 31. Each consists of a follower button 383 which passes through a boss 384 on the switch cap 385 attached to the switch base 386, and engages the switch arm 387 which is anchored by the screw 388 to the post 389 of the switch base 386. At the opposite end of the switch arm is the arm contact 390 and the limit contacts 391 and 392. The latter are held in spaced relation by a separating post 393 against the switch base 386 by the screw 394. Connection is made to the bottom ends of the screws 388 and 394 for the attachment of electrical conductors.

Tailstock mechanism

The tailstock, generally designated 12, contains the dead center 13 which opposes the live center 6 on the headstock 5, and which supports the opposite end of the work piece. (Figures 8, 9 and 10.) The dead center 13 is mounted within the rack sleeve 335 and is adjusted to and fro by the spur gear 336 mounted on the vertical shaft 337 engaged by the clamping handle 338. The dead center 13 may thus be racked in or out by turning the clamping handle 338, and then locked in position by the use of the same handle. The tailstock 12 is adjustable longitudinally of the frame of the machine by means of the bolts 396 engaging the clamping plates 397 at one end and the nuts 398 at the other end. The clamping plates 397 engage the slotted portions 399 in the main frame or bed of the machine.

Push button switch panel

In addition to the automatically operated switches previously described, the machine tool is provided with a switch panel 395 (Figure 36) having manually operated push button switches thereon. These push buttons are of a normally-closed type. The six upper buttons pertain to various feeding movements of the lathe carriages and the starting and stopping of the machine, whereas the two lower buttons serve to actuate a four-way switch.

The action of these buttons will be described later. They are designated as follows: in-feed push button switch 400, the front left feed push button switch 401, the rear in-feed push button switch 402, the spindle stop push button switch 403, the start push button switch 404, the reverse push button switch 405 and the four-way push button switch 406 having the feed-in button 407 and the feed-out button 408.

Electrical circuits

The electrical control circuit interconnecting the various carriage-operated switches, push button switches, relays and magnetic clutches is shown in Figure 38. Power is received from the 110-volt direct current mains 409 and 410 at the power line switch 425, these lines constituting the sources of power current. From the power mains the line 410 runs to one terminal each of the following magnetic clutches: front in-feed 128, front left feed 110, front-out feed rapid traverse 122, front-right-feed rapid traverse 113, rear in-feed 146, rear out-feed rapid traverse 108, main drive clutch 28 and main drive brake 51. Another branch of the power line 410 runs to the terminal 410 on the main panel, and thence by the same line 410 to the coil of the relay 412, the coil of the two-pole contactor 413 and the coil of the relay 414. The power current from the line 409 is connected to the terminal 409 on the main panel, and thence goes to the reverse push button switch 405. From the opposite side of the latter, the line 416 runs back by the terminal 416 on the main panel to the other terminal of the coil of the two-pole contactor 413, the latter being of a normally-closed type. Another branch of the line 409 goes to the switch of the split relay 418, and also to the switch of the brake-and-clutch relay 421.

From the switch terminal 422 of the brake-and-clutch relay 421, the line 422 goes to the terminal 422 on the main panel, also to the post 422 on the main drive magnetic brake 51.

The switch terminals 423 of the split relay 418, the right front relay 419 and the rear-out relay 420 are all joined by the line 423 to the terminal 423 on the main panel, and this is joined by a continuation of the line 423 to one side of the starting push button switch 404. From the opposite terminal 424 of the starting push button switch, the line 424 runs by way of the terminal 424 on the main panel to the coil terminal 424 of the relay 414, to the opposite terminal 410 to which the power line 410 is connected, returning to the power line switch 425 and completing the circuit.

One pole of the 14-volt control circuit is grounded at the dynamotor 426 through the line 427 therefrom. Current from the other pole 428 goes by the line 428 to the terminal 428 on the main panel, thence to the switch terminal 428 of the relay 414, likewise to the coil terminal 428 of the right front relay 419 and also to the coil terminal 428 of the rear-out relay 420. From the opposite switch terminal 429 of the relay 414, the line 429 runs to the right to the coil terminal 429 of the split relay 418, the coil terminal 429 of the rear-in relay 430 and to the coil terminal 429 of the brake-and-clutch relay 421: from the same switch terminal 429 of the relay 414, another branch line 429 runs to the coil terminals 429 of the front-out relay 431, the coil terminal 429 of the relay 432 and to the coil terminal 429 of the front-in relay 433.

Electrical and mechanical operation

To operate the machine tool, the line switch 425 is closed and the starting push button switch 404 depressed, disconnecting the lines 423 and 424, and connecting the lines 436 and 437. This deenergizes and opens the normally-closed relay 414 which now allows control current to proceed from the switch terminal 428 along the line 429 to the brake-and-clutch relay 421, energizing it by way of the line 441 to and through the normally-closed-spindle stop push botton switch 403 to the ground. Meanwhile even before the starting push button switch 404 was depressed, the closing of the line switch 425 caused the front right relay 419 and the rear-out relay 420 to become energized and closed by current along the line 428 from the dynamotor 426, their opposite terminals 456 and 457 respectively being connected to the ground through the front-right switch 265 and the rear-out switch 382 respectively. The two-pole contactor 413 was also energized thereby directly from the power line 410, the opposite pole 416 being connected to the power line 409 at the reverse push button switch 405.

The depressing of the starter button 404 causes the relay 414 to become de-energized by the de-energization of the line 424 leading to its coil. The switch blade of the relay 414 accordingly flies open, connecting the line 428 with the line 429 and thus allowing current to pass therethrough to the upper half of the split relay 418, energizing it through the line 438 leading to the ground through the front-out switch 273. The front-in relay 433 is also energized from the lines 429 and 436, the latter leading through the now-depressed push button starter switch 404 to and through the line 437 leading to the ground through the front-in switch 272. The relay 412 now becomes energized by the power line 409 at the now-closed split relay 418, becoming connected to the power line 410 by way of the line 434, the switchblade of the now-closed front-in relay 433, the line 448 through the switchblade of the now-closed relay 432, and the line 446 to and through the switchblade of the now-closed split relay 418 to its power line terminal 409.

A branch of line 429 also runs from the relay 414 to the coil of the rear-in relay 430, but the latter is not energized since its ground circuit 439 through the rear-in push button 402 is in open circuit until the normally-open rear carriage pick-up switch 264 is closed by the motion of the front carriage: beyond the latter switch the line 440 runs to the ground through the rear-in switch 381.

The front-out relay 431 is also energized by depressing the starter button 404, through the line 429 on the one hand and the line 438 on the other, the latter leading directly to the ground through the front-out switch 273. The relay 432 is similarly energized from the line 429 on one side through the line 443 leading to the two-pole contactor switch 413 and thence by the line 444 to the template follower switch 300, thence by the line 445 to the ground through the front-left switch 253.

The brake-and-clutch relay 421 is similarly energized from the line 429 on the one side and the line 441 on the other side, the latter leading to the ground through the spindle stop push button switch 403.

All of the above energizations, and the de-energization of the relay 414 occur either through the closing of the line switch 425, or through the depressing of the push button starter switch 404.

Meanwhile the closing of the split relay 418, the relay 432 and the front-in relay 433 now permits current to flow from the power line 409 to the split relay 416 through the line 446, the relay 432 switchblade, the line 448, the front-in relay 433 switchblade, the line 434, the front-in push button switch 400, the line 435, the four-way switch 406 and the continuation of the line 435 to the front-in magnetic clutch 128, energizing it and connecting it to the main driving motor 20.

The energization of the brake-and-clutch relay 421 disconnects the line 422 from the switch blade of the brake-and-clutch relay 421 and the power line 409 leading thereto, thus de-energizing the main drive magnetic brake 51 and releasing the main spindle for free rotation. At the same time the closing of the brake-and-clutch relay 421 connects its switch blade and the power line 409 attached thereto to the line 442, thereby energizing the main drive clutch 28 and starting the rotation of the main drive shaft and its associated mechanism. The spindle thus starts revolving.

The tool feeds inward until the front carriage cross slide stop 296 trips the front feed-in stop switch 272 through the push rod 289, breaking the circuit in the line 437. This de-energizes the line 436 connected through the relay 412 switch blade, and also de-energizes the front-in relay 433. The switch blade of the latter flies up, de-energizing relay 412, and enabling current to flow from the power line 409 through the switch blade of the energized split relay 418 by way of the line 446 through the switch blade of the energized relay 432, thence by way of the line 448 through the switch blade of the de-energized front-in relay 433, by way of the line 449 to the front-left push button switch 401, thence along the line 450 to the front left feed clutch, energizing the latter. The tool then stops feeding inward through the de-energization of the front-in relay 433, and starts feeding longitudinally leftward.

The tool continues to feed longitudinally leftward until the front-left stop switch 253 is tripped and opened by the stationary stop arm 254. This opens the circuit in the line 445, which de-energizes the line 444 and the line 443 joining it across the lefthand switch blade of the two-pole contactor 413, and thus de-energizing the relay 432 connected thereto. The switch blade thereof then flies upward, disconnecting the line 448 from its power connection through the switch blade with the line 446 (which has been energized with power current from the line 409 through the switch blade of the split relay 418). This de-energizes the line 448, the line 449 connected thereto at the front-in relay 433, and the line 450 leading to the front-left feed magnetic clutch 110, de-energizing the latter and stopping the longitudinal feed of the front carriage leftward.

At the same time, the upward shifting of the switch blade of the thus de-energized relay 432 connects the power current line 446 to the line 451 therethrough, and current can then proceed therealong to the switch blade of the front-out relay 431. The latter has been energized from the lefthand branch of the line 429 at the upper switch blade of the normally-closed relay 414, which has been opened as explained above. The switch blade of the front-out relay 431, therefore, closes, allowing power current to flow therethrough along the line 452 through the four-way switch 406, continuing along the line 452 to the front-out rapid traverse magnetic clutch 122, energizing the latter. The tool then starts a rapid traverse motion outward.

The tool slide moves rapidly outward until its out-limit stop 299 (Figure 22) trips the front-out limit switch 273, thus opening the circuit in the line 438. This de-energizes the split relay 418 connected thereto, and likewise de-energizes the front-out relay 431 connected to the line 438. The latter opens the circuit and de-energizes the front-out magnetic clutch 122, stopping the outward traveling of the tool slide.

Meanwhile the tool on the rear carriage is brought into operation by the leftward longitudinal movement of the front carriage, which trips the rear carriage pick-up switch 264 prior to reaching its lefthand limit stop 254. The tripping of the rear carriage pick-up switch 264 closes the circuit between the lines 439 and 440, thus energizing the lower half of the split relay 418 connected thereto through the righthand switch blade of the two-pole contactor 413 and the line 453.

The closing of the rear carriage pick-up switch 264 also energizes the rear-in feed relay 430 by way of the line 439 through the rear-in push button switch 402. This causes power current to flow from the power line 409 at the split relay 418 through its closed switch blade along the line 446 to and through the closed switch blade of the rear-in feed relay 430, thence along the line 447 to the rear-in feed magnetic clutch 146, energizing the latter and causing the rear tool slide to feed inward until it trips the rear-in feed switch 381.

The de-energization of the split relay 418 causes its switch blade to open, and the power line 409 to be disconnected from the line 446 and reconnected to the line 423. This permits power current to flow along the line 423 to and through the switch blade of the front-right relay 419, which has been closed by the previous energization thereof through the line 428, running to the dynamotor 426. Current then flows along the line 455 from the right front relay 419 to energize the right front rapid traverse magnetic clutch 113. After the rear-in switch 381 has been tripped, and the split relay 418 de-energized the front carriage is rapidly traversed rightward until it trips the front-right switch 265.

In the meantime, the rear tool slide moves inward until it trips the rear-in feed limit switch 381, opening the circuit in the line 440 and de-energizing the rear-in feed relay 430 connected thereto through the line 439 running through the now closed rear carriage pick-up switch 264 to the line 440.

The de-energization of the rear-in feed relay disconnects the line 447 from the line 446 by the opening of its switch blade, and thus de-energizes the rear-in feed magnetic clutch 146. The rear tool slide, therefore, stops its inward feeding motion.

At the same time the lower half of the split relay 418 is de-energized by the opening of the switch 381 through the de-energization of the line 453 connected to the line 440 at the two-pole contactor 413. The switch blade of the split relay 418, therefore, flies upward, causing current to flow from the power line 409 along the line 423 rightward through the switch blade of the previously energized rear-out relay 420 (energized from the line 428 leading to the dynamotor 426), thence along the line 454 to the rear-out rapid traverse magnetic clutch 108, energizing the latter. The rear tool slide, therefore, starts moving rapidly outward from the work piece until it trips the rear-out switch 382. This opens the circuit in the line 457, de-energizes the rear-out relay 420 connected thereto, and also de-energizes the rear-out rapid traverse magnetic clutch 108, as the switch blade of the rear-out relay 420 flies open.

To cause the tool to feed outward and rapidly traverse inward, thus reversing the described mode of operation of the cross slide mechanism, the direction of rotation of the cross slide gearing is reversed by shifting the lever 191 on the apron of the front carriage. At the same time, the four-way switch 406 is shifted so as to disconnect the lines 435 and 452 from their continuations beyond the switch 406, and cross connect them so that the continuation of the line 452 is connected to the line 435 and the continuation of the line 435 is connected to the line 452. The mechanical reversal of the cross slide mechanism causes the front-out rapid traverse clutch 122 to function as a front-in rapid traverse clutch, and also causes the front-in feed clutch 128 to function as a front-out feed clutch. The shifting of the four-way switch 406 causes the connections to the above clutches to be reversed so that the front-in relay 433 now controls and energizes the front-out rapid traverse clutch 122, and so that the front-out relay 431 controls and energizes the front-in feed clutch 128.

The machine is now started as usual by depressing the starter push button switch 404, whereupon the front-in relay 433 is energized as previously described, causing the front-out rapid traverse clutch 122 to rapidly traverse the front tool slide inward until it trips the front-in stop switch 272. The opening of this switch deenergizes the front-in relay 433 in the manner previously described, causing power current to be diverted through its switch blade to the line 449, thence through the front-left push button switch 401 and the line 450 to the front-left feed clutch 450, energizing it. As the longitudinal feed lead screw is rotating in its usual direction, the front tool is caused to feed to the left until the front left limit switch 253 is tripped by the fixed stop 254 in the previous manner. When this occurs, the longitudinal feed leftward is stopped and the front-out relay 431 becomes operative. Through the above described reversal of the mechanical and electrical connections for the cross slide, the front-out relay 431 distributes power current by way of the lines 446, 451, 452 and 435 to the front-in feed clutch 128, energizing it. This now functions, it will be recalled, to feed the front tool outward.

The front tool feeds outward until it trips the front-out switch 273, whereupon the front-out relay 431 becomes inoperative and the front-right relay 419 and the front-right rapid traverse magnetic clutch become operative as previously disclosed. This rapidity traverses the tool rightward to its starting point.

To reverse the tool slide and return it to its starting position at any time during operations, the reverse push button switch 405 is depressed manually. This opens the circuit between the power line 409 and the line 416, opening the relay 432, the two-pole contactor 413 and the split relay 418. The opening of the latter relay causes current to flow through the switch blade of the already-closed rear-out relay 420 to the rear-out clutch 108, energizing it and thus withdrawing the rear tool from the work piece. By the opening of the relay 432, the front-out relay 431 becomes operative to distribute power current through its switch blade to the front-out rapid traverse clutch 122, thus likewise withdrawing the front tool from the work piece.

*Template follower switch operation*

To enable the machining of the stepped work pieces with a single tool, the template follower switch 300 is arranged with its follower button 301 in position to follow the template 301. The direction of rotation of the cross feed screw is reversed in the apron by shifting the lever 191 on the front apron, so that the front-out rapid traverse clutch 122 will function to rapidly traverse the front tool inward, and also that the front-in feed clutch 128 will correspondingly feed the front tool outward. The front feed rod and the front lead screw rotate normally, however, so that the front carriage feeds to the left and rapidly traverses to the right as usual. The four-way switch 406, however, is shifted so as to cross-connect the lines 452 and 435. This makes the front-out relay 431 operate the front-in feed clutch 128 (now functioning as an out-feed clutch by the reversal of the cross-feed mechanism). It also makes the front-in relay 433 operate and control the front-out rapid traverse clutch 122 now functioning as an inward rapid traverse clutch because of the reversal of the cross-feed mechanism. The carriage is arranged so that its template switch 300 and its follower button 307 lie opposite the righthand end of the template 301. The machine is started in the usual way by depressing the starting push button switch 404. The front-in relay 433 is to be energized as previously described, but, through the shifting of the four-way switch 406, it now energizes the front-out rapid traverse clutch through the lines 434, 435 and 452.

The front-out rapid traverse clutch 122, through the reversal of the cross slide mechanism, now feeds the tool slide rapidly inward until it trips the front-in switch 272. This de-energizes the front-in relay 433 and starts the tool feeding longitudinally leftward in the usual manner, with the follower button 307 of the template follower switch 300 moving along the longitudinal edge of the template.

The tool feeds to the left until the follower button 307 encounters the first step 319 of the template 301 (Figure 22): this causes the switch contacts of the template follower switch 300 to be operated, opening the circuit between the lines 444 and 445, and de-energizing the relay 432 through the lines 443 leading thereto from the two-pole contactor 413. The switch blade of the relay 432 then opens, and connects the already energized line 446 to the line 451 and thence to the line 452 across the closed switch blade of the already energized front-out relay 431. Current then flows therethrough into the line 452 to the reversed four-way switch 406, and then proceeds along the line 435 to the front-in feed clutch 128, energizing the latter. The front-in feed clutch now functions to feed the tool slide outward due to the reversal of the cross-feed mechanism.

The tool slide and the cutting tool feed outward until the follower button 307 reaches the corner of the first shoulder 319, when it flies back, closing the contacts of the template follower switch 300. This causes the tool again to feed to the left by the re-energization of the longitudinal feed mechanism previously described, until the follower button 307 encounters the second shoulder of the template 301. Thereupon the contacts of the template follower switch 300 are again separated, the longitudinal feed again stopped and the outward feed again started. This cycle of operations repeats itself until the template follower switch 300 is opened, the template and the tool slide feeds outward until front-out switch 273 is tripped and the tool is accordingly traversed rapidly back to its starting position by the right-front rapid traverse clutch 113 relay 419 in the manner previously described.

The template and follower switch apparatus shown herein is also adapted to the machining of work pieces with curved steps or inclined tapers. The sequence of operations therein is shown diagrammatically in Figure 43, and is similar to that previously described for regularly-stepped work pieces.

It will be noted that the main drive clutch 28 and the main drive magnetic brake 51 operate alternately through the two-way brake-and-clutch relay 421. Consequently, when the clutch on the main drive is engaged by starting the machine, the brake thereon is released. In a similar manner, when the work rotation is stopped, as by pressing the spindle stop push button 403, the brake-and-clutch relay 421 is de-energized through the open circuit in the line 441, opening the switch blade thereof, thereby de-energizing the main drive clutch 28 and instantly energizing the main drive brake 51. This alternate action of clutch-and-brake prevents spinning of the work piece when the spindle is stopped, and consequently no time is lost in loading the machine.

The machine as a whole may be stopped by disengaging the line switch 425. This opens the circuit in both of the power lines 409 and 410, thus cutting off the source of power current both from the various clutches and from the dynamotor 426.

It will be understood that I desire to comprehend within my invention such modifications as may be necessary to adapt it to varying conditions and uses.

Having thus fully described my invention, what I claim as new and desire to secure by Letters Patent is:

1. A carriage for a machine tool, comprising a movable support having longitudinal moving mechanism and transverse moving mechanism, a transversely movable cross slide, a source of longitudinal moving power, a source of transverse moving power, electrical means responsive to the positions reached by said support and said cross slide for predeterminately setting in motion and stopping said longitudinal and transverse moving sources of power, and means within said carriage for reversing said transverse motion.

2. A carriage for a machine tool, comprising a movable support having longitudinal moving mechanism and transverse moving mechanism, a transversely movable cross slide, a source of longitudinal moving power, a source of transverse moving power, electrical means for setting in motion and stopping said longitudinal and transverse moving sources of power, and means within said carriage for reversing said transverse motion, said electrical means comprising electrical switches adapted to be opened and closed by the motion of said carriage and said cross slide respectively.

3. A carriage for a machine tool, comprising a movable support having longitudinal moving mechanism and transverse moving mechanism, a transversely movable cross slide, a source of longitudinal moving power, a source of transverse moving power, electrical means for setting in motion and stopping said longitudinal and transverse moving sources of power, and means within said carriage for reversing said transverse motion, said electrical means comprising electrical switches adapted to be opened and closed when said longitudinal and transverse motions have operated through predetermined distances, whereby the electrical actuating means for the transverse motion in one direction may be made to control the transverse motion in the opposite direction through said reversing means.

4. A carriage for a machine tool, comprising a movable support having longitudinal moving mechanism and transverse moving mechanism, a transversely movable cross slide, a source of longitudinal moving power, a source of transverse moving power, an electrical switch mounted on each end of said carriage and adapted to be opened and closed by the motion of said carriage to and from predetermined positions whereby to control the application of longitudinal moving power to said carriage, and an electrical pick-up switch adapted to be actuated to control electrical apparatus external of said carriage when said carriage reaches a predetermined position.

5. A carriage for a machine tool comprising a movable support having longitudinal moving mechanism and transverse moving mechanism, a source of longitudinal moving power, a source of transverse moving power, a cross slide mounted on said carriage adapted to be moved transversely by said transverse moving mechanism, and an electrical circuit interrupter associated with said cross slide adapted to be actuated when said cross slide reaches a predetermined position.

6. A carraige for a machine tool comprising a movable support having longitudinal moving mechanism and transverse moving mechanism, a source of longitudinal moving power, a source of transverse moving power, a cross slide mounted on said carriage adapted to be moved transversely by said transverse moving mechanism, and a pair of electrical circuit interrupters associated with said cross slide adapted to be actuated when said cross slide reaches its limit of motion in forward and reverse directions determined by said circuit interrupters.

7. A carriage for a machine tool comprising a movable support having longitudinal moving mechanism and transverse moving mechanism, a transversely movable cross slide, a source of longitudinal moving power, a source of transverse moving power, electrical means for simultaneously setting in motion said longitudinal moving source of power and stopping said transverse moving sources of power, said means comprising a guiding member and a switch adapted to engage the guiding member to be opened and closed thereby during the motion of said carriage.

8. A carriage for a machine tool comprising a movable support having longitudinal moving mechanism and transverse moving mechanism, a transversely movable cross slide, a source of longitudinal moving power, a source of transverse moving power, and electrical means for simultaneously setting in motion said longitudinal moving source of power and stopping said transverse moving sources of power, said means comprising a circuit interrupter associated with a guiding member movable relatively thereto and adapted to be opened and closed thereby during the relative motion therebetween.

9. A carriage for a machine tool comprising a movable support having longitudinal moving mechanism and transverse moving mechanism, a transversely movable cross slide, a source of longitudinal moving power, a source of transverse moving power, electrical means for simultaneously setting in motion said longitudinal moving source of power and stopping said transverse moving sources of power, and means for reversing said transverse motion within said carriage, said electrical means comprising a circuit interrupter associated with a guiding member movable relatively thereto and adapted to be opened and closed thereby during the relative motion therebetween.

10. A carriage for a machine tool, comprising a longitudinally movable support, a transversely movable cross slide thereon, electrically controlled longitudinal and transverse moving mechanisms therefor, and electrical means for starting and stopping said longitudinal and transverse moving mechanisms alternately, said electrical means comprising a guiding member and a circuit interrupter adapted to engage the guiding member to be opened and closed thereby during the relative motion therebetween.

11. A machine tool, including a source of power, a carriage, a bed, means for moving said carriage when connected to a source of power, magnetic clutches for connecting and disconnecting said carriage moving means to said power source, an electrical circuit interrupter associated with said carriage and arranged to control said clutches, and means on said bed adapted to operate said circuit interrupter when said carriage reaches predetermined positions during its motion, said circuit interrupter being adapted to control the actuation of said magnetic clutches, said clutches being located externally of said carriage.

12. A machine tool comprising a source of power, a power-moved work holder, a bed, a carriage movable on said bed by said power, electrical means adapted selectively to connect and disconnect said carriage moving means with said power source, and a switch in circuit to control the actuation of said electrical means, a template of variable contour arranged to open and close said switch when said carriage reaches predetermined positions on said bed in response to the variations of the contour of said template.

13. A machine tool comprising a source of power, a power-moved work-holder, a bed, a carriage movable on said bed by said power, electro-magnetic clutches adapted to connect said carriage-moving means with said power source, and a circuit interrupter comprising a switch and a template engaged thereby adjustably mounted on the bed for interrupting the flow of current to said electro-magnetic clutches when said carriage reaches a predetermined position on said bed.

14. A machine tool comprising a source of power, a power-moved work holder, a bed, a carriage movable on said bed by said power, electro-magnetic means adapted to connect said carriage moving means with said power source, and a circuit interrupter comprising a shaft and adjustable stops on the shaft associated with each end of said carriage to interrupt the flow of current to said electro-magnetic means when said carriage reaches a predetermined position.

15. A machine tool comprising a source of power, a power-moved work holder, a bed, a carriage movable on said bed by said power, electro-magnetic means adapted to connect said carriage-moving means with said power source, a cross slide on said carriage, electromagnetic means for connecting said cross slide to said power source, and means comprising a shaft and adjustable stops on the shaft for interrupting the flow of current to said electro-magnetic means when said carriage and said cross slide reach predetermined positions.

16. A machine tool comprising a source of power, a power-moved work holder, a bed, a carriage movable on said bed by said power, electro-magnetic means adapted to connect said carriage-moving means with said power source, a cross slide on said carriage, electro-magnetic means for connecting said cross slide to said power source, and means comprising a shaft and adjustable stops on the shaft for interrupting the flow of current to said electro-magnetic means when said carriage and said cross slide reach predetermined positions at the opposite limits of their motion determined by said interrupting means.

17. A machine tool comprising a source of power including a circuit, a power-moved work holder, a bed, a carriage movable on said bed by said power, electro-magnetic means in the circuit adapted to connect said carriage-moving means with said power source, a guiding member adjustably mounted on the bed, and a switch in the circuit movable relative to said guiding member and adapted to engage it to open and close the circuit during the movement of said carriage to energize and de-energize said electro-magnetic means.

18. A machine tool comprising a source of power including a circuit, a power-moved work holder, a bed, a carriage movable on said bed by said power, electro-magnetic means in the circuit adapted to connect said carriage-moving means with said power source, a guiding member adjustably mounted on the bed, and a switch in the circuit movable relative to said guiding member, said switch being mounted on said carriage and adapted to engage said guiding member to open and close the circuit during the motion of said carriage to energize and de-energize said electro-magnetic means.

19. A machine tool comprising a source of power, a power-moved work holder, a bed, a carriage movable longitudinally along said bed by said power, a cross slide movable transversely of said carriage by said power, electro-magnetic means for connecting said carriage and said cross slide to said source of power to move the same, a guiding member, and an electrical circuit interrupter adapted to engage said guiding member and movable relatively thereto by the motion of said carriage to interrupt the flow of current to said carriage and cross slide moving means alternately according to the configuration of said guiding member.

20. A machine tool comprising a source of power, a power-moved work holder, a bed, a carriage movable longitudinally along said bed by said power, a cross slide movable transversely of said carriage by said power, electro-magnetic means for connecting said carriage and said cross slide to said source of power to move the same in oppositely reversible directions, a guiding member, and an electrical circuit interrupter adapted to engage said guiding member and movable relatively thereto by the motion of said carriage to interrupt the flow of current to said carriage and cross slide moving means alternately according to the configuration of said guiding member.

21. A machine tool comprising a source of power, a power-moved work holder, a bed, a carriage moved longitudinally along said bed by said power, a cross slide movable transversely of said carriage by said power, electro-magnetic means for connecting said carriage and said cross slide to said source of power to move the same in oppositely reversible directions, means associated with said carriage and said cross slide to interrupt the flow of current to said carriage-moving means and said cross slide-moving means when said carriage and said cross slide reach predetermined limits of travel, a guiding member, and means associated with said guiding member and movable relatively thereto by the motion of said carriage to interrupt the flow of current to said carriage and cross slide-moving means alternately according to the configuration of said guiding member.

22. A machine tool comprising a source of power, a power-moved work holder, a bed, a carriage moved longitudinally along said bed by said power, a cross slide movable transversely of said carriage by said power, electro-magnetic means for connecting said carriage and said cross slide to said source of power to move the same in oppositely reversible directions, means associated with said carriage and said cross slide to interrupt the flow of current to said carriage-moving means and said cross slide-moving means when said carriage and said cross slide reach predetermined limits of travel, a guiding member, means associated with said guiding member and movable relatively thereto by the motion of said carriage to interrupt the flow of current to said carriage and cross slide-moving means alternately according to the configuration of said guiding member, and an additional circuit breaker associated with said carriage to be operated when said carriage reaches a predetermined position to energize electrical apparatus external of said carriage.

23. A machine tool comprising a source of power, a power-moved work holder, a bed, a front carriage movable longitudinally along said bed by said power, a cross slide movable transversely of said front carriage by said power, a rear carriage having a cross slide movable transversely thereof by said power, electro-magnetic means for connecting said carriages and said cross slides to said source of power to move the same, and means associated with one of said carriages to cause the other carriage-moving mechanism to become operative when said first-mentioned carriage reaches a predetermined position.

24. A machine tool comprising a source of power, a power-moved work holder, a bed, a front carriage movable longitudinally along said bed by said power, a cross slide movable transversely of said front carriage by said power, a rear carriage having a cross slide movable transversely thereof by said power, electro-magnetic means for connecting said carriages and said cross slides to said source of power to move the same, and an electrical circuit interrupter associated with one of said carriages to cause the other carriage-moving mechanism to become operative when said first-mentioned carriage reaches a predetermined position.

25. A machine tool comprising a source of power, a power-moved work holder, a bed, a front carriage movable longitudinally along said bed by said power, a cross slide movable transversely of said carriage by said power, a rear carriage having a cross slide movable transversely thereof by said power, means associated with one of said carriages to cause the other carriage-moving mechanism to become operative when said first-mentioned carriage reaches a predetermined position, and means associated with one of said carriages to interrupt the flow of current to said carriage moving means when said carriage reaches a predetermined limit of travel.

26. A machine tool comprising a source of power, a power-moved work holder, a bed, a front carriage movable longitudinally along said bed by said power, a cross slide movable transversely of said carriage by said power, a rear carriage having a cross slide movable transversely thereof by said power, means associated with one of said carriages to cause the other carriage-moving mechanism to become operative when said first-mentioned carriage reaches a predetermined position, means associated with one of said carriages to interrupt the flow of current to said carriage-moving means when said carriage reaches a predetermined limit of travel, a guiding member on the bed, and means associated with said guiding member and movable relatively thereto by the motion of said carriage to interrupt the flow of current to said carriage and cross slide-moving means alternately according to the configuration of said guiding member.

27. A machine tool comprising a source of power, a power-moved work holder, a bed, a carriage movable longitudinally along said bed by said power, a cross slide movable transversely of said carriage by said power, electro-magnetic means for connecting said carriage and said cross slide to said source of power to move the same in oppositely reversible directions, means for electrically controlling the distribution of power current to said electro-magnetic means, and means for interchanging the distribution of current to said electro-magnetic means.

28. A machine tool comprising a source of power, a power-moved work holder, a bed, a carriage movable longitudinally along said bed by said power, a cross slide movable transversely of said carriage by said power in oppositely reversible directions, electro-magnetic clutches for connecting said carriage and said cross slide to said source of power to move the same, electro-magnetic relays to control the distribution of power current to said electro-magnetic clutches, and means for interchanging the connections of said relays to oppositely distribute the current from said relays to said electro-magnetic clutches.

29. A machine tool comprising a source of power, a power-moved work holder, a bed, a carriage movable longitudinally along said bed by said power, a cross slide movable transversely of said carriage by said power in oppositely reversible directions, electro-magnetic clutches for connecting said carriage and said cross slide to said source of power to move the same, electro-magnetic relays to control the distribution of power current to said electro-magnetic clutches, means for interchanging the connections of said relays to oppositely distribute the current from said relays to said electro-magnetic clutches, and means for reversing the cross slide movable mechanism within the carriage.

30. A machine tool comprising a source of power, a power-moved work holder, a bed, a carriage movable longitudinally along said bed by said power, a cross slide movable transversely of said carriage by said power in oppositely reversible directions, electro-magnetic clutches for connecting said carriage and said cross slide to said source of power to move the same, electro-magnetic relays to control the distribution of power current to said electro-magnetic clutches, and means for interchanging the connections of said relays to oppositely distribute the current from said relays to said electro-magnetic clutches, the speed of travel of said carriage being greater in one direction than in another direction.

31. A machine tool comprising a source of power, a power-moved work holder, a bed, a carriage movable longitudinally along said bed by said power, a cross slide movable transversely of said carriage by said power in oppositely reversible directions, electro-magnetic clutches for connecting said carriage and said cross slide to said source of power to move the same, electro-magnetic relays to control the distribution of power current to said electro-magnetic clutches, and means for interchanging the connections of said relays to oppositely distribute the current from said relays to said electro-magnetic clutches, the speed of travel of said carriage and said cross slide being greater in one direction than in another direction.

32. A machine tool comprising a source of power, a power-moved work holder, a bed, a carriage movable longitudinally along said bed by said power, a cross slide movable transversely of said carriage by said power, electro-magnetic clutches for connecting said carriage and said cross slide to said source of power to move the same, electro-magnetic relays to control distribution of power current to said electro-magnetic clutches, means for interchanging the connections of said relays to oppositely distribute the current from said relays to said electro-magnetic clutches, a guiding member, and an electrical circuit interrupter associated with said guiding member and movable relatively thereto by the motion of said carriage to interrupt the flow of current to said carriage and cross slide-moving means ordinately according to the configuration of said guiding member.

33. A machine tool comprising a source of power, a power-moved work holder, a bed, a carriage movable longitudinally along said bed by said power, a cross slide movable transversely of said carriage by said power, electro-magnetic clutches for connecting said carriage and said cross slide to said source of power to move the same, electro-magnetic relays to control distribution of power current to said electro-magnetic clutches, means for interchanging the connections of said relays to oppositely distribute the current from said relays to said electro-magnetic clutches, a guiding member, an electrical circuit interrupter associated with said guiding member and movable relatively thereto by the motion of said carriage to interrupt the flow of current to said carriage and cross slide-moving means ordinately according to the configuration of said guiding member, and means for reversing the cross slide-moving mechanism within the carriage, whereby the relay normally arranged to distribute current to the electro-magnetic clutch actuating the motion in one direction will be caused instead to distribute current to the electro-magnetic clutch actuating the motion in the opposite direction.

34. A machine tool comprising a source of power, a power-moved work holder, a bed, a carriage movable longitudinally along said bed by said power, a cross slide movable transversely of said carriage by said power, electro-magnetic clutches for connecting said carriage and said cross slide to said source of power to move the same, electro-magnetic relays to control distribution of power current to said electro-magnetic clutches, means for interchanging the connections of said relays to oppositely distribute the current from said relays to said electro-magnetic clutches, a guiding member, an electrical circuit interrupter associated with said guiding member and movable relatively thereto by the motion of said carriage to interrupt the flow of current to said carriage and cross slide-moving means ordinately according to the configuration of said guiding member, and means for reversing the cross slide-moving mechanism within the carriage, whereby the relay normally arranged to distribute current to the electro-magnetic clutch actuating the motion in one direction will be caused instead to distribute current to the electro-magnetic clutch actuating the motion in the opposite direction, the speed of travel of said carriage being greater in one direction than in another direction.

35. A machine tool comprising a source of power, a power-moved work holder, a bed, a carriage movable longitudinally along said bed by said power, a cross slide movable transversely of said carriage by said power, electro-magnetic clutches for connecting said carriage and said cross slide to said source of power to move the same, electro-magnetic relays to control distribution of power current to said electro-magnetic clutches, means for interchanging the connections of said relays to oppositely distribute the current from said relays to said electro-magnetic clutches, a guiding member, an electrical circuit interrupter associated with said guiding member and movable relatively thereto by the motion of said carriage to interrupt the flow of current to said carriage and cross slide-moving means ordinately according to the configuration of said guiding member, and means for reversing the cross slide-moving mechanism within the carriage, whereby the relay normally arranged to distribute current to the electro-magnetic clutch actuating the motion in one direction will be caused instead to distribute current to the electro-magnetic clutch actuating the motion in the opposite direction, the speed of travel of said carriage and said cross slide being greater in one direction than in another direction.

36. A machine tool comprising a source of power, a power-moved work holder, a bed, a carriage movable longitudinally along said bed by said power, a cross slide movable transversely of said carriage by said power, electro-magnetic clutches for connecting said carriage and said cross slide to said source of power to move the same, electro-magnetic relays to control distribution of power current to said electro-magnetic clutches, means for interchanging the connections of said relays to oppositely distribute the current from said relays to said electro-magnetic clutches, a guiding member, and an electrical circuit interrupter associated with said guiding member and movable relatively thereto by the motion of said carriage to interrupt the flow of current to said carriage and cross slide-moving means ordinately according to the configuration of said guiding member, the speed of travel of said cross slide being greater in one direction than in another direction.

37. In a machine tool, a template of variable contour, a carriage, a tool slide mounted on the carriage, a switch on the tool slide having a switch operating follower pin engageable with said template and operated thereby, lead screw means for actuating the carriage, feed rod means for actuating the tool slide and mechanical means within the carriage for reversing the application of power from the feed rod to the tool slide.

38. In a machine tool, a template of variable contour, a carriage, a tool slide mounted on the carriage, a switch on the tool slide having a switch operating follower pin engageable with said template and operated thereby, lead screw means for actuating the carriage, feed rod means for actuating the tool slide and both mechanical and electrical means for reversing the application of power from the feed rod to the tool slide.

39. In a machine tool, a template, a carriage, a tool slide mounted on the carriage, a switch on the tool slide having a switch operating follower pin engageable with said template and operated thereby, lead screw means for actuating the carriage, feed rod means for actuating the tool slide and means of reversing the application of power from the feed rod to the tool slide mechanically, and means for controlling electrically the actuation of the feed rod and the lead screw comprising limit switches associated with said tool slide and carriage for regulating the movement thereof.

40. In a machine tool, a template, a carriage, a tool slide mounted on the carriage, a switch on the tool slide having a switch operating a follower pin engageable with said template, lead screw means for actuating the carriage, feed rod means for actuating the tool slide, means of reversing the application of power from the feed rod to the tool slide mechanically, means for controlling electrically the actuation of the feed rod and the lead screw comprising limit switches associated with said tool slide and carriage for regulating the movement thereof, and means comprising contact shoes and contact rails for supplying electrical energy to at least a portion of the switches on the carriage and tool slide irrespective of the relative movement thereof.

41. In a machine tool, means for supporting a tool for transverse and longitudinal movements, a template, means for causing said movements to take place through the application of electric power, switches associated with means for effecting said movements, at least one of which comprises a switch arm engageable with said template, and means for preventing an over-run movement of said tool in order to secure an accurate stopping of the tool in order that it may cut on a work piece the same configuration as the outline of said template.

42. In a machine tool, a bed, an arm extending forwardly and laterally in spaced relationship from said bed, a template mounted on said arm, a carriage adapted to move between said arm and the bed and to overhang said arm and template, switch means adapted to control the movement of said carriage and its tool slide having a switch arm engageable as a cam follower with the template carried on the arm.

43. In a machine tool, a bed, an arm extending forwardly and laterally in spaced relationship from said bed, a template mounted on said arm, a carriage adapted to move between said arm and the bed and to overhang said arm and template, switch means adapted to control the movement of said carriage and its tool slide having a switch arm engageable as a cam follower with the template carried on the arm, other associated switches with the tool slide and carriage adapted to control the movement thereof through a feed rod and lead screw, means to mechanically reverse the application of power by the feed rod to the tool slide, and means to electrically reverse the action of at least one of said switches.

44. In combination in a machine tool, a carriage and tool slide adapted to have longitudinal and transverse movements, electrical means adapted to actuate said tool slide and carriage through a feed rod and lead screw respectively, switch means adapted by the movement of said carriage and tool slide for controlling the application of such power, at least one of said switches being controlled by a template, a template, means to electrically reverse the application of electric power and the control thereof by said switches, and means to mechanically reverse the application of power to the tool slide.

45. In a machine tool, a carriage comprising an apron, a supporting bed, a tool slide reciprocable on the bed above the apron, a feed rod, means for driving the tool slide from said feed rod, reverse gearing between said feed rod and tool slide, a switch actuated by the movement of said tool slide controlling electric power driving said feed rod.

46. In a machine tool, a carriage comprising an apron, a supporting bed, a tool slide reciprocable on the bed above the apron, a feed rod, means for driving the tool slide from said feed rod, reverse gearing between said feed rod and tool slide, a switch actuated by the movement of said tool slide controlling electric power driving said feed rod and the direction of driving of said feed rod whereby the tool slide may be reversed in its direction of movement mechanically and electrically.

CLIFFORD A. BICKEL.